US011355904B1

(12) United States Patent
Bronson

(10) Patent No.: US 11,355,904 B1
(45) Date of Patent: Jun. 7, 2022

(54) ENVIRONMENTALLY SEALED ENCLOSURE ATTACHABLE ONTO POLE BEFORE OR AFTER FIELD INSTALLATION

(71) Applicant: Glenn Joseph Bronson, Chelmsford, MA (US)

(72) Inventor: Glenn Joseph Bronson, Chelmsford, MA (US)

(*) Notice: Subject to any disclaimer, the term of this patent is extended or adjusted under 35 U.S.C. 154(b) by 0 days.

(21) Appl. No.: 16/672,343

(22) Filed: Nov. 1, 2019

Related U.S. Application Data

(60) Provisional application No. 62/754,510, filed on Nov. 1, 2018.

(51) Int. Cl.
| | | |
|---|---|---|
| H02G 3/08 | (2006.01) | |
| H02B 5/02 | (2006.01) | |
| H02B 1/46 | (2006.01) | |
| H02G 7/20 | (2006.01) | |

(52) U.S. Cl.
CPC .............. *H02B 1/46* (2013.01); *H02B 5/02* (2013.01); *H02G 7/20* (2013.01)

(58) Field of Classification Search
CPC ... H02B 1/46; H02B 5/02; H02B 5/00; H02B 1/26; H02B 1/00; H02B 1/01; H02B 1/30; H02B 1/32; H02G 7/20; H02G 7/205; H02G 3/08; H02G 3/081
USPC ......... 174/50, 520, 535, 559, 560, 561, 562; 220/3.2–3.9, 4.02; 361/600, 601; 248/519
See application file for complete search history.

(56) References Cited

U.S. PATENT DOCUMENTS

| | | | | | |
|---|---|---|---|---|---|
| 3,341,718 | A | * | 9/1967 | Acker | F21S 8/088 307/157 |
| 3,400,905 | A | * | 9/1968 | Dusen, Jr. | E04H 12/2253 403/369 |
| 5,059,748 | A | * | 10/1991 | Allen | H01R 13/5216 174/87 |
| 7,219,873 | B2 | * | 5/2007 | Harwood | E04H 12/2261 181/171 |
| 7,690,613 | B2 | * | 4/2010 | Bowman | H01F 27/02 248/346.01 |
| 7,723,612 | B2 | * | 5/2010 | Butler | F21S 8/086 174/45 R |
| 7,765,770 | B2 | * | 8/2010 | Fournier | E02D 27/42 174/45 R |
| 7,851,702 | B2 | * | 12/2010 | Fournier | H02G 3/081 174/45 R |
| 10,760,753 | B2 | * | 9/2020 | Ducros | H02G 3/083 |
| 10,988,954 | B2 | * | 4/2021 | Ducros | F21S 8/086 |

* cited by examiner

*Primary Examiner* — Angel R Estrada
(74) *Attorney, Agent, or Firm* — Adibi IP Group, PC; Amir V. Adibi; Andrew C. Palmer

(57) ABSTRACT

A pole attachable enclosure is installable, replaceable, and accessible from ground level on poles installed in various deployments for camera, lights, and antennas. The pole attachable enclosure provides a secure, tamper resistant enclosure for electronic and support equipment in both new and retrofit installations to improve serviceability and protect investment.

20 Claims, 32 Drawing Sheets

SIDE VIEW WITH ANTI-TAMPER GATE REMOVED AND LATCHES UNLOCKED

FRONT VIEW WITHOUT ANTI-TAMPER GATE

FRONT VIEW WITH ANTI-TAMPER GATE

SIDE VIEW OF ROTATING POLE ABOUT HINGE

SIDE VIEW OF ROTATED POLE WITH ACCESS TO CONTAINER

ENVIRONMENTALLY SEALED ENCLOSURE ATTACHABLE ONTO POLE BEFORE OR AFTER FIELD INSTALLATION

CROSS REFERENCE TO RELATED APPLICATION

This application claims the benefit under 35 U.S.C. § 119 of U.S. Provisional Patent Application Ser. No. 62/754,510, entitled "Camera Pole Module," filed on Nov. 1, 2018, the subject matter of each of which is incorporated herein by reference.

TECHNICAL FIELD

The described embodiments relate generally to optical support systems, and more particularly to optical support systems deployed in outdoor settings.

BACKGROUND INFORMATION

The availability of affordable imaging devices and network connectivity has made camera deployment widespread, but a large portion of the cost is installation, and ongoing maintenance. Many of these cameras must be mounted in a location to gain the best vantage point, as well as be secure from vandalism. The location is usually at odds with serviceability, many times requiring ladders and boom lifts. To solve this problem, a typical solution of hinged, ground based poles allow the camera or other equipment at the top to be accessed by a service technician on the ground. Although hinged, ground based poles for cameras and other equipment have been available in industry for lighting and other hardware, they do not address the requirements of modern camera systems and deployment which may have batteries, electronics, and a variety of other sensors and devices that require service, upgrades and changes over time. Pre-existing art and practices typically attach a weatherproof service panel or box or enclosure to the pole near ground level, or on the ground on a pad near the pole. This facilitates service and access to support equipment but has several large disadvantages. First, it not only adds to the cost of the pole installation, but also makes the installation vulnerable to vandalism and tampering. Second, it does not facilitate access to the camera or equipment at the top of the pole without even more investment in an additional, tilting pole. None of these solutions offers a cost-effective solution for maintenance and access over time, thus increasing the cost of ownership of the camera pole.

SUMMARY

A cost effective, tilting camera pole attachable enclosure combination accepts components which are installable, replaceable, and accessible from ground level. The pole attachable enclosure provides a secure, tamper resistant enclosure around the components and tilt access to the camera or other equipment, such as 5G equipment, that is attached to the pole. In one embodiment, a pole attachable enclosure is installable, replaceable, and accessible from ground level on poles installed in various deployments for camera, lights, and antennas. The pole attachable enclosure provides a secure, tamper resistant enclosure for electronic and support equipment in both new and retrofit installations to improve serviceability and protect investment.

Further details, embodiments, methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

The embodiments disclosed below address several issued with conventional pole systems. The novel embodiments disclosed herein provide more cost effective, pole enclosures that are installable, replaceable, and accessible from ground level in tilt base, fixed base, or buried configurations. The novel embodiments disclosed herein provide a secure, waterproof, tamper resistant enclosure for camera, antenna, or other equipment mounted on the pole.

Figure 1:
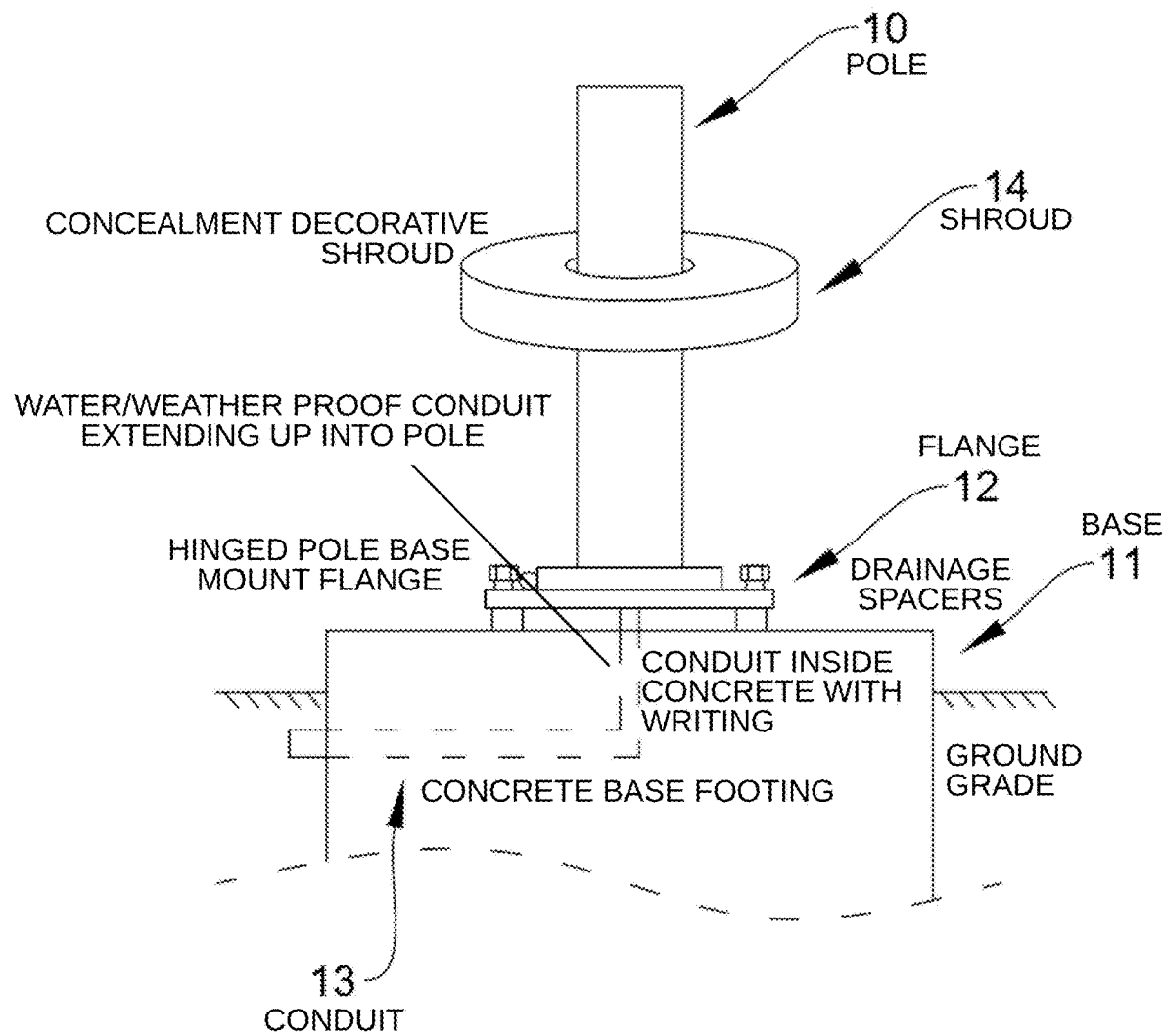
FIG. 1 is a diagram of a pole 10 mounted on a concrete base 11.

FIG. 1 is a diagram of a pole 10 mounted on a concrete base 11. The typical pole 10 is mounted to the concrete base 11 with a four-bolt flange 12. For illustrative purposes, the flange 12 is shown also hinged so the pole 10 may be rotated or "tipped" to the side. A conduit 13 for power and communication extends upwards from the concrete base 11 and extends up into the pole 10. The flange 12 is bolted to the concrete base 11 with spacers to allow water to drain from the inside of the pole 10. A decorative shroud 14 slides down the pole to conceal the flange 12.

Figure 2:
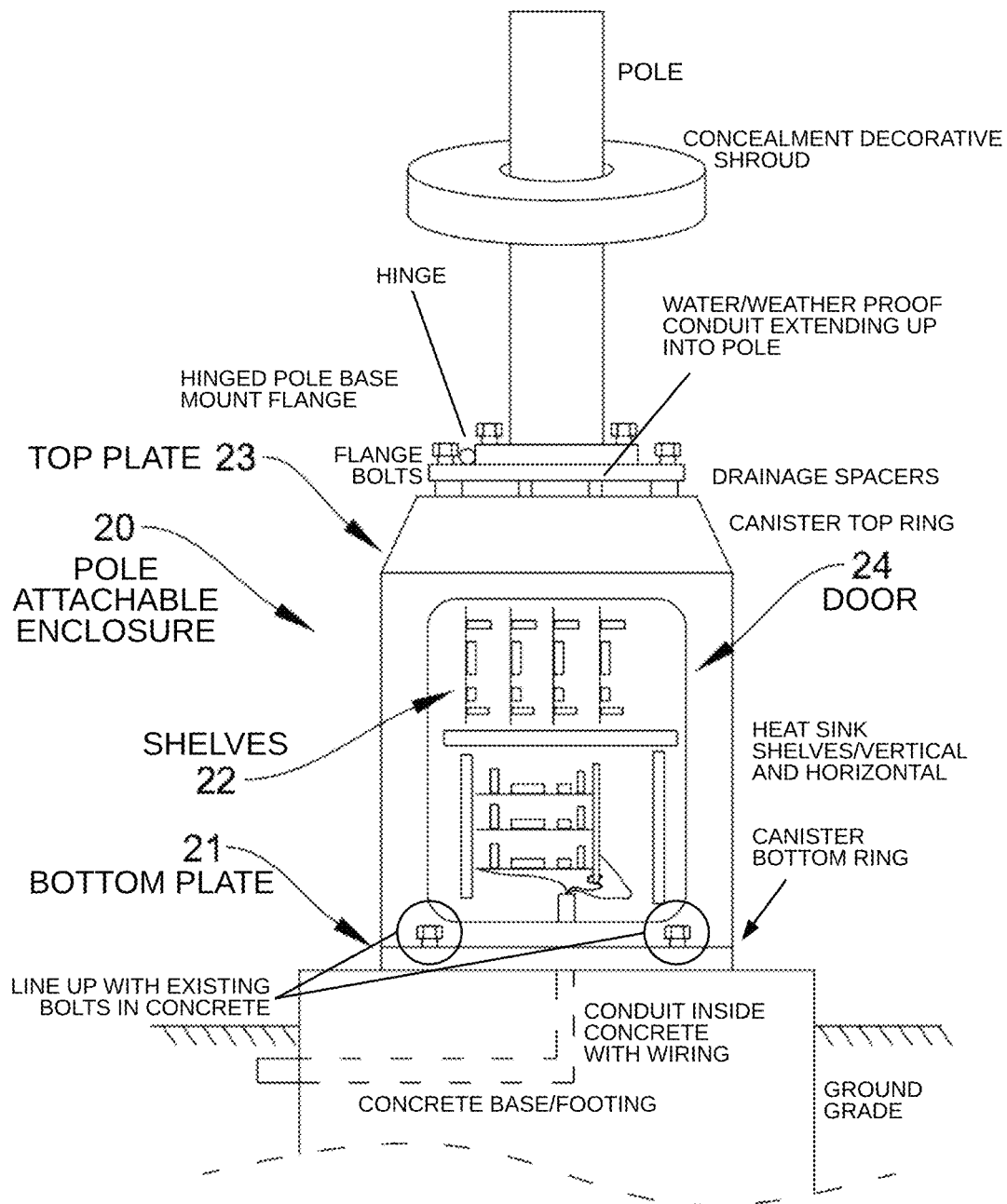
FIG. 2 shows one embodiment of a novel pole attachable enclosure 20.

FIG. 2 shows one embodiment of a novel pole attachable enclosure 20. The pole attachable enclosure 20 is attached between the existing concrete base 11 and pole flange 12 shown in FIG. 1. The pole attachable enclosure 20 may also be referred to as an "enclosure", "module", or "canister". The pole attachable enclosure 20 has a bottom plate 21, also referred to as a "bottom plate ring", "bottom ring", or "bottom interface", that aligns with and matches the holes mounted on the existing concrete base 11. The bottom plate 21 allows the pole attachable enclosure 20 to be secured from the inside. The pre-existing conduit shown in FIG. 1 used to supply power via power lines extends through the bottom plate 21 and supplies power to shelves 22. The shelves 22 are support structures that support electronics or other components within the pole attachable enclosure 20. The pole attachable enclosure 20 has a top plate 23, also referred to as a "top plate ring", "top ring", or "top interface", that matches the pole flange 12 that is bolted to the pole. The data, power, radio and other connections from the electronics extend through one or more conduits through the bottom of the pole 10. The conduits are sealed into the pole attachable enclosure 20 top ring 23 and extend up into the pole 10 high enough to prevent leakage. The bottom 21 of the pole attachable enclosure 20 may be sealed or open to the concrete depending on if it needs to be watertight. The pole attachable enclosure 20 opening may have a vented, weather, and/or waterproof door 24.

Unlike conventional pole systems, the pole attachable enclosure 20 allows a variety of options and configurations as explained herein. In one example, the pole attachable enclosure 20 is used to retrofit an existing pole installed in the field. In another example, the pole attachable enclosure 20 is used in an entirely new installation, as shown in FIG. 3.

Figure 3:
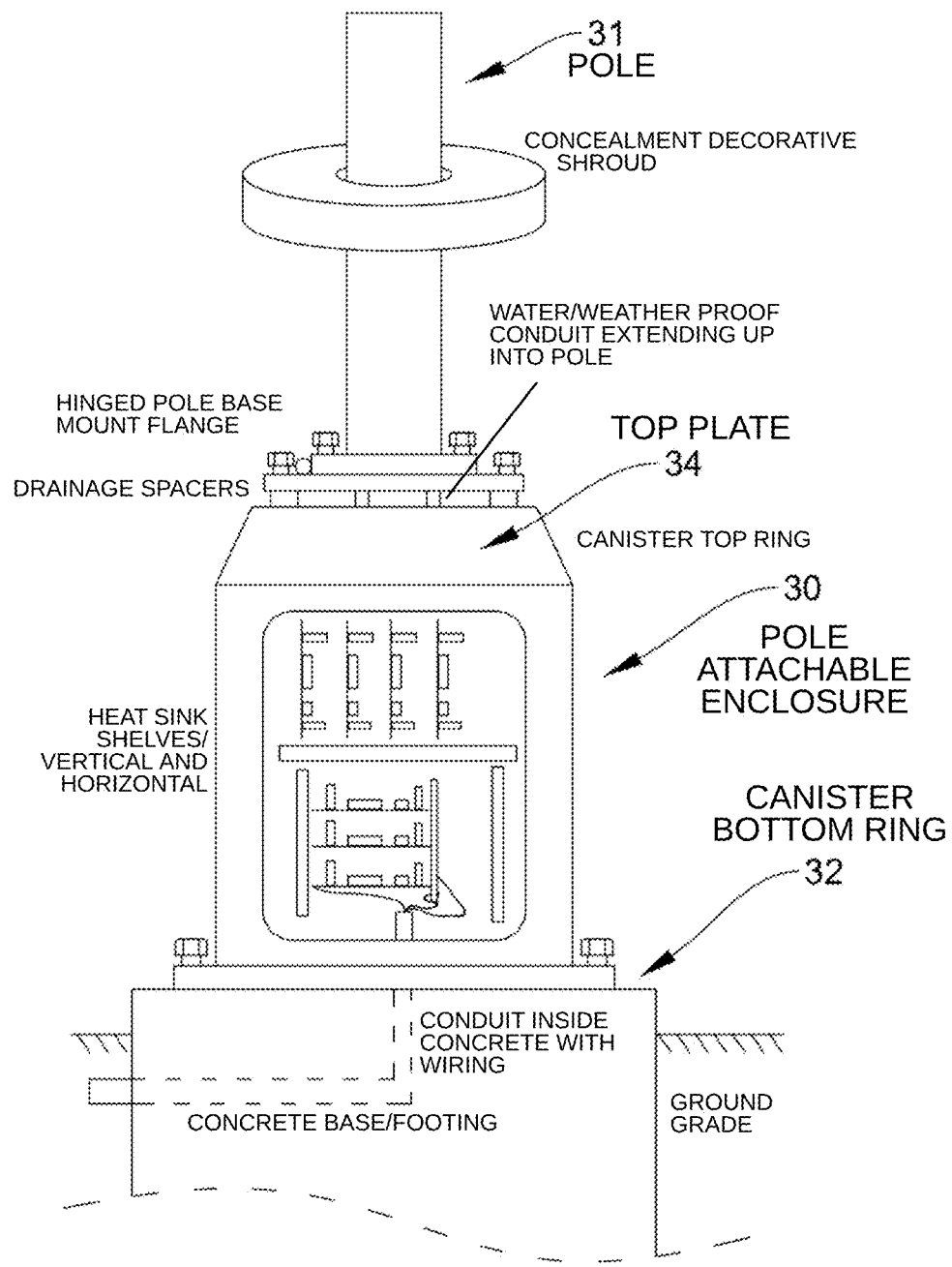
FIG. 3 is a diagram showing another embodiment of a pole attachable enclosure 30 installed on a new pole 31.

FIG. 3 is a diagram showing another embodiment of a pole attachable enclosure 30 installed on a new pole 31. The pole attachable enclosure 30 has a bottom ring 32 that has been widened and bolted to concrete in the outside.

Figure 4:
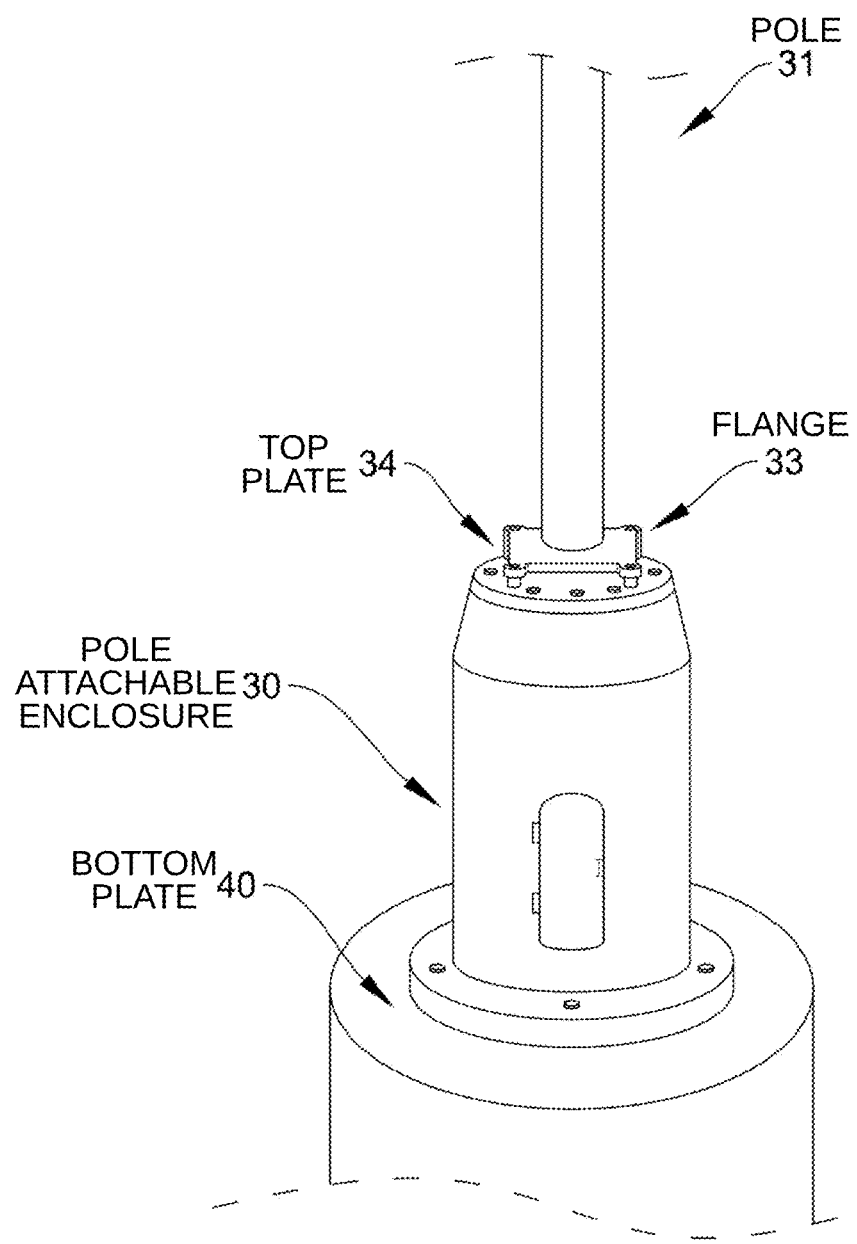
FIG. 4 is a diagram showing a top view of the pole attachable enclosure 30 deployed in a new pole 31.

FIG. 4 is a diagram showing a top view of the pole attachable enclosure 30 deployed in a new pole 31. The pole 31 is secured to a top plate 34 using a non-hinged, four bolt flange 33. The top plate 34 that the flange bolts to is bolted to the top of the pole attachable enclosure 30 in this case to illustrate one possible attachment technique. It is understood that in other embodiments, flange 33 can be welded to the top plate 34 or welded to part of the pole attachable enclosure 30. In this example, the flange 33 has drain spacers on each bolt between itself and the top plate 34. In other examples, pole flanges 33 may be bolted and secured in any fashion to the top plate 34 of the pole attachable enclosure 30.

Figure 5:
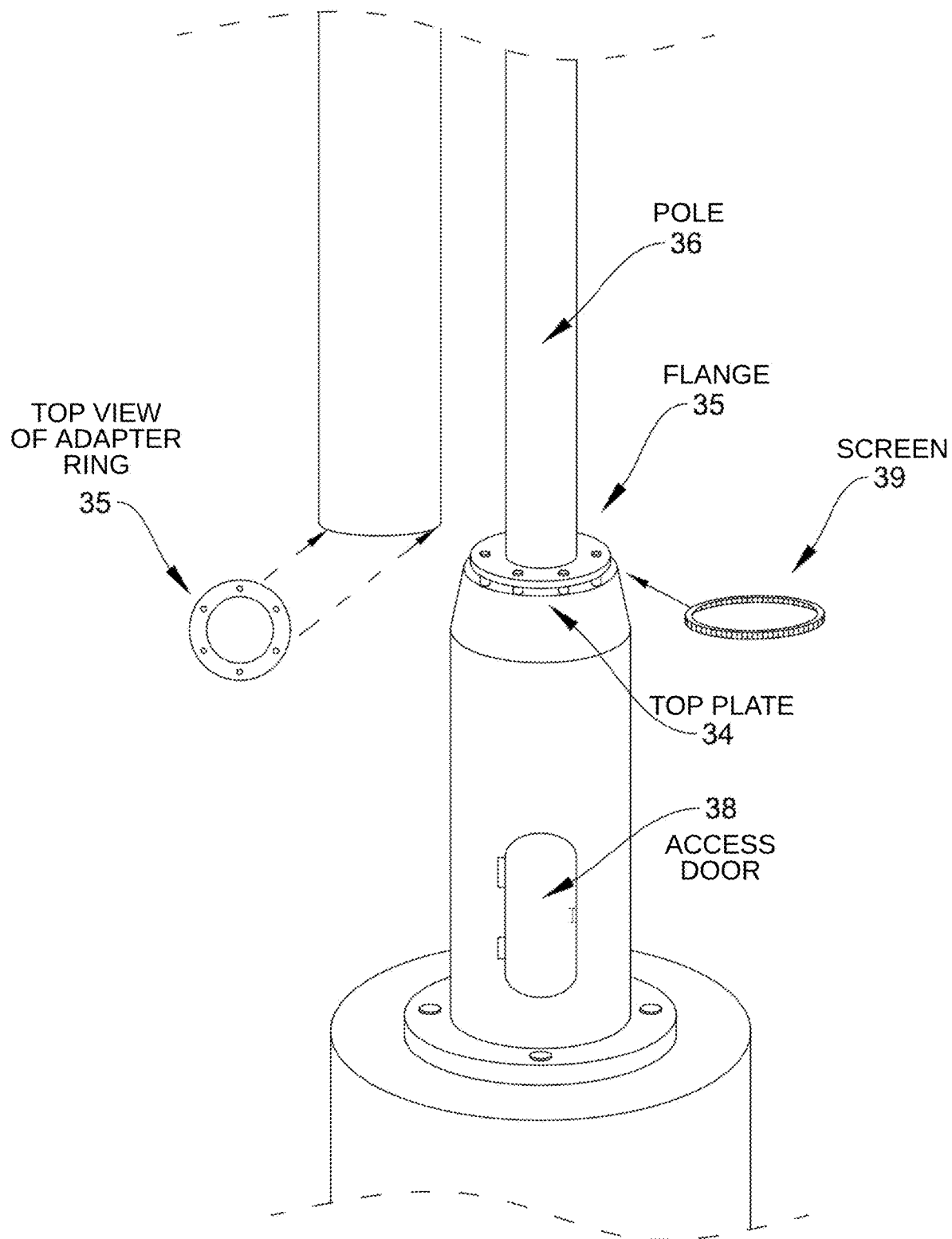
FIG. 5 illustrates the pole attachable enclosure 30 attached to a pole with a six bolt, round flange 35 having drain spacers.

FIG. 5 illustrates the pole attachable enclosure 30 attached to a pole with a six bolt, round flange 35 having drain spacers. The flange 35 is also referred to as an "adapter ring". An expanded view of the larger diameter pole 36 is shown to the left of pole 36. Pole 36 has the adapter ring 35 welded to the inside. This larger pole 36 can be secured atop the pole attachable enclosure 30 and bolted from the inside through the access door 38. A bug screen 39 is shown that can fit around the drain space between the pole attachable enclosure 30 and the pole 36. In various embodiments, top plate 34 and bottom plate 40 of the pole attachable enclosure 30 may be an integral part of the pole attachable enclosure 30 such that they are formed from a single unitary structure and the appropriate holes are made for the bolts and conduits as needed. In other embodiments, top plate 34 and bottom plate 40 of the pole attachable enclosure 30 may be separate components which are bolted or welded to the canister in some fashion to be sealed and strengthened.

Figure 6:
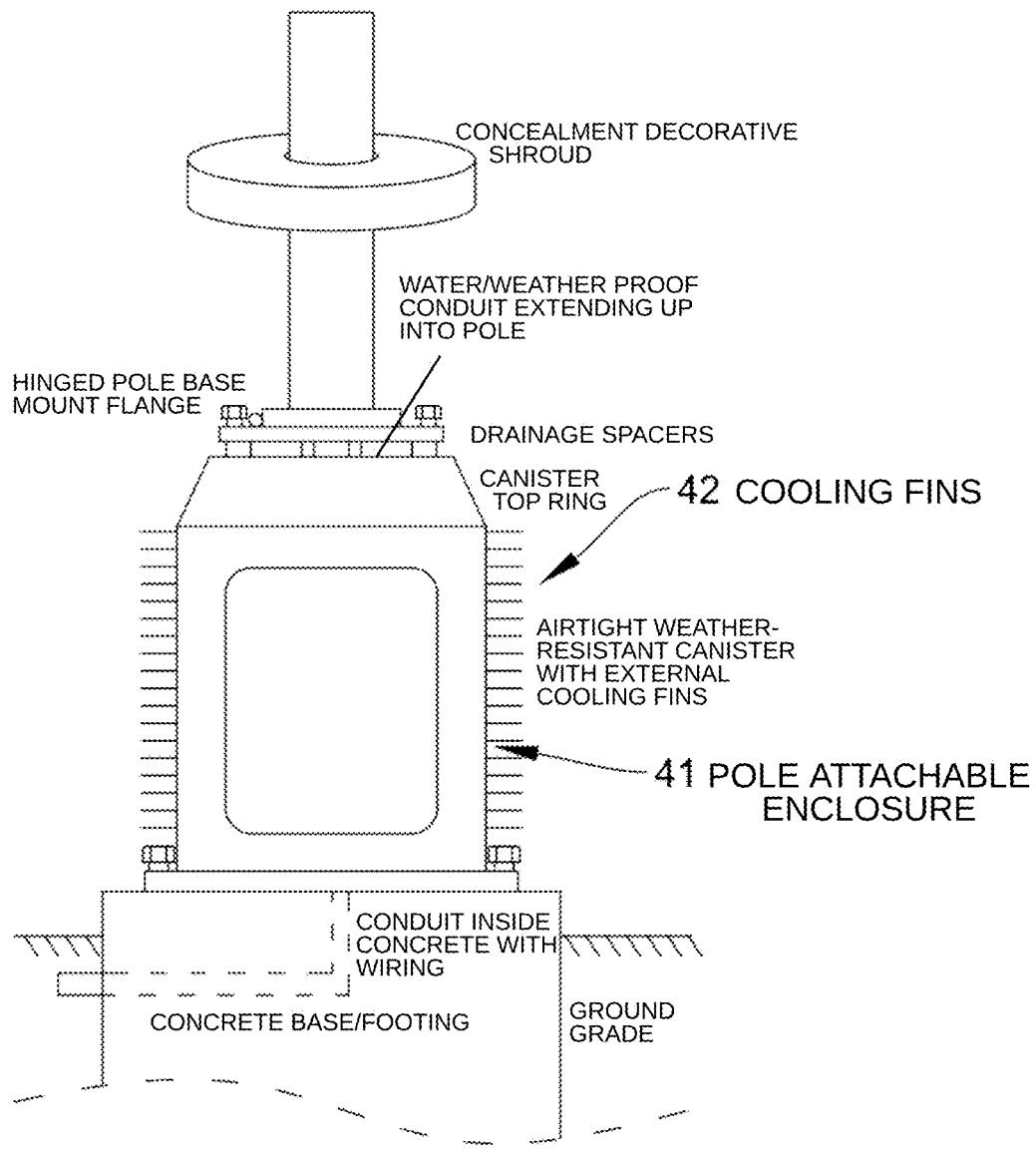
FIG. 6 is a diagram of another embodiment of a pole attachable enclosure 41 that is waterproof and environmentally sealed and includes external cooling fins 42.

FIG. 6 is a diagram of another embodiment of a pole attachable enclosure 41 that is waterproof and environmentally sealed and includes external cooling fins 42. Electronic components are supported inside the pole attachable enclosure 41 by heat sinks and shelves. Internal fans are optionally included to dissipate the heat to the outside casing of the pole attachable enclosure 41. Some embodiments have no internal fans. In this example, the pole attachable enclosure 41 is made from heat conductive material such as aluminum or steel.

Figure 7:
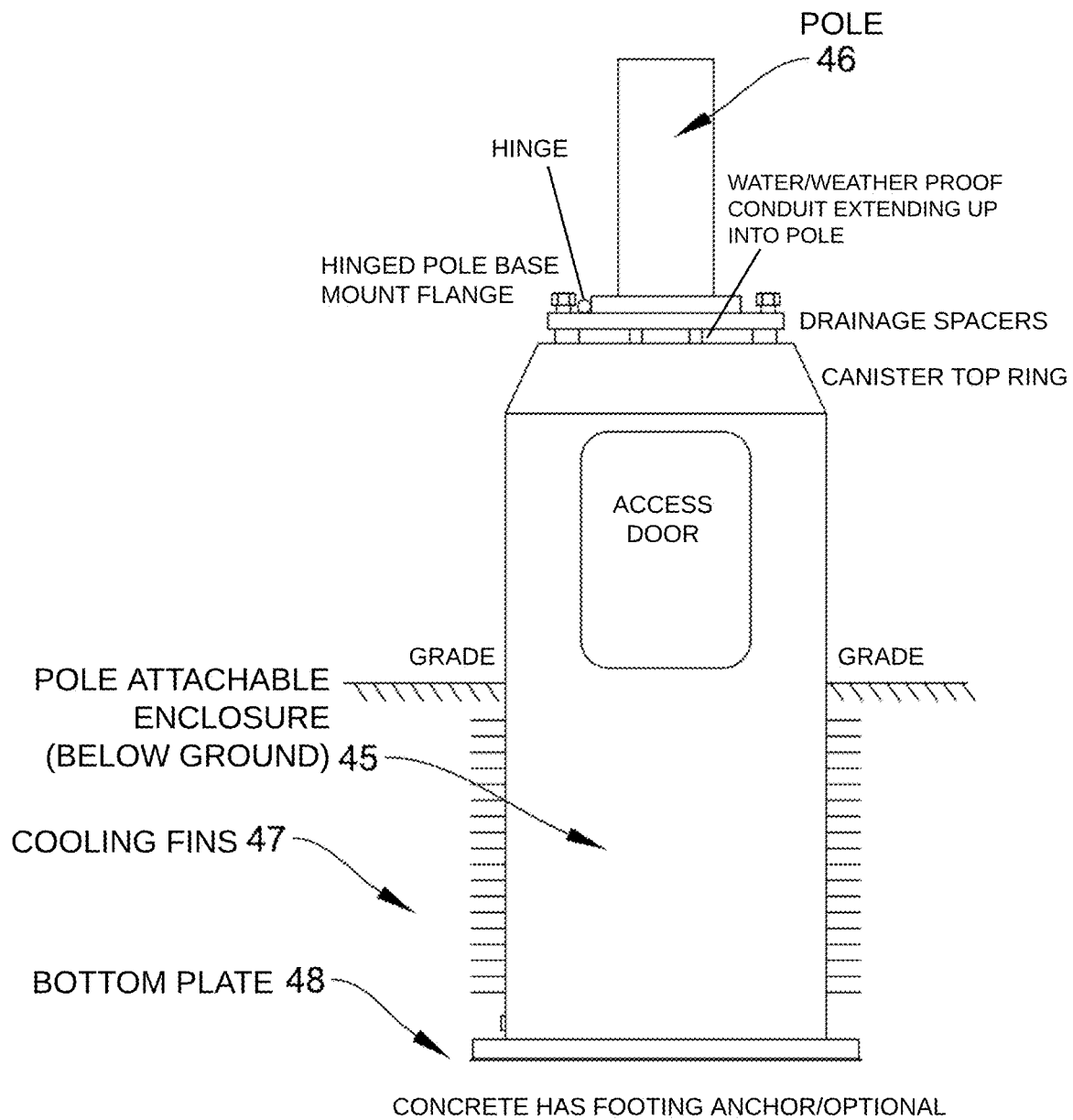
FIG. 7 is a diagram of another embodiment of a pole attachable enclosure 45 that is buried below the footing of pole 46.

FIG. 7 is a diagram of another embodiment of a pole attachable enclosure 45 that is buried below the footing of pole 46. In this embodiment, the pole attachable enclosure 45 has a longer length and provides more room for equipment below grade as compared to other pole attachable enclosure embodiments. In this illustration the fins 47 are below ground only. The bottom plate ring 48 is buried in the ground and may be set in concrete underneath the pole attachable enclosure 45. In various embodiments the pole attachable enclosure 45 may be deployed in this form with no fins, fins below ground, fins above ground, or fins both above and below ground.

Figure 8:
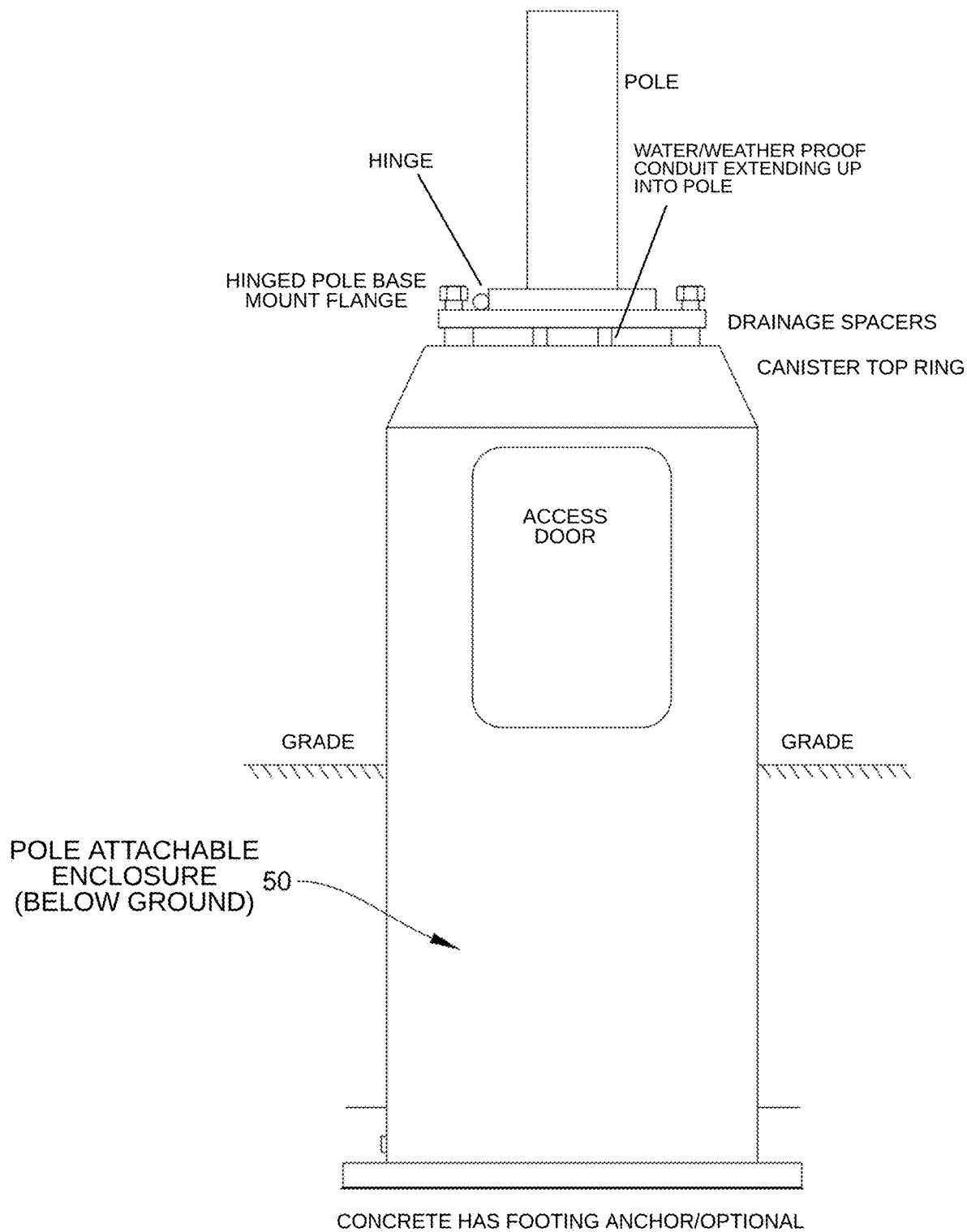
FIG. 8 is a diagram of another embodiment of a pole attachable enclosure 50 that is partially buried below ground.

FIG. 8 is a diagram of another embodiment of a pole attachable enclosure 50 that is partially buried below ground. The pole attachable enclosure 50 has no fins.

Figure 9:
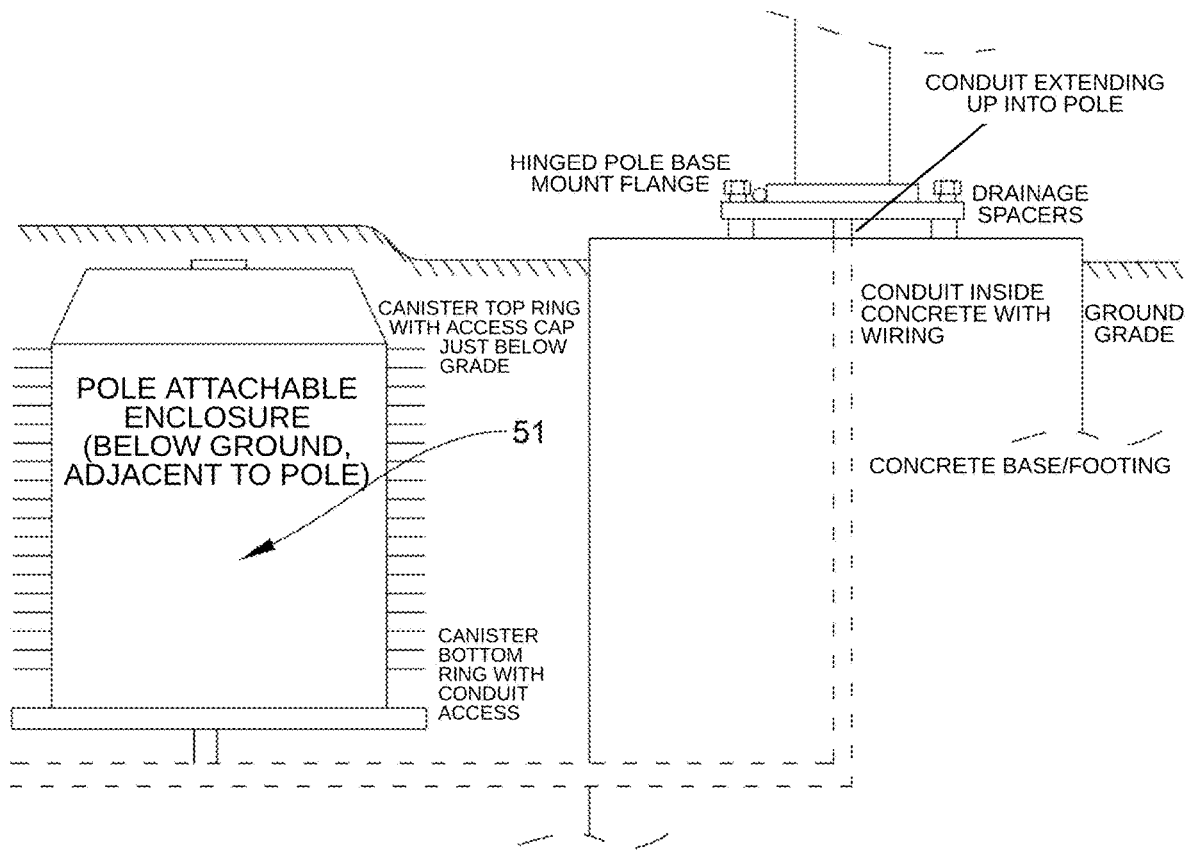
FIGS. 9 and 10 are diagrams of embodiments of pole attachable enclosures 51 and 52 having an access cover top ring and cooling fins, buried alongside a traditional pole mounted atop a concrete base.
Figure 10:
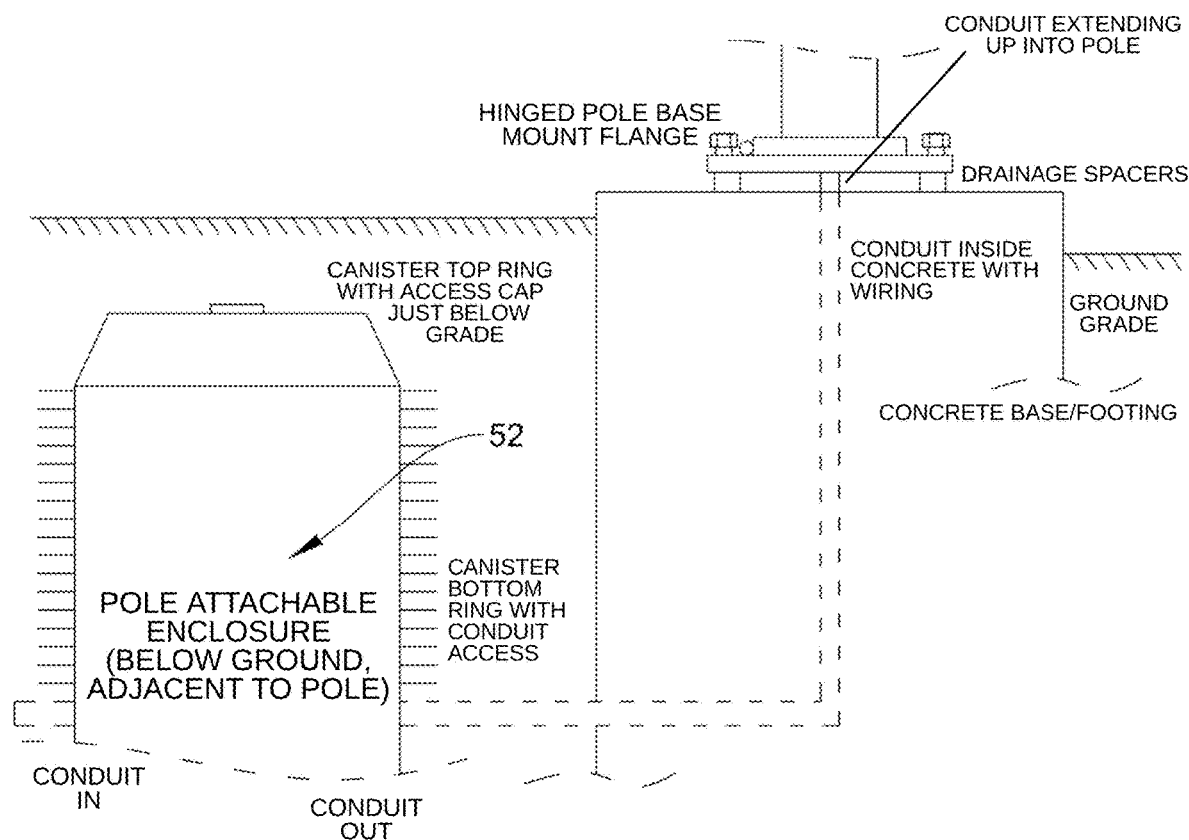

FIGS. 9 and 10 are diagrams of embodiments of pole attachable enclosures 51 and 52 having an access cover top ring and cooling fins, buried alongside a traditional pole mounted atop a concrete base. In these examples, the pole attachable enclosures 51 and 52 intercept a power conduit extending from the pole and has another conduit coming out toward the pole. In this configuration the pole attachable enclosures 51 and 52 may be made of plastic or other corrosion resistant material. Using the pole attachable enclosures 51 and 52 in this deployment can retrofit and existing pole configuration easily while concealing valuable equipment such as data drives or other storage from vandalism. In practicality, the entire pole above ground could be destroyed or disabled and the equipment in the buried pole attachable enclosures 51 and 52 would still survive. In various embodiments, pole attachable enclosures 51 and 52 buried in the ground may or may not have cooling fins.

Figure 11:
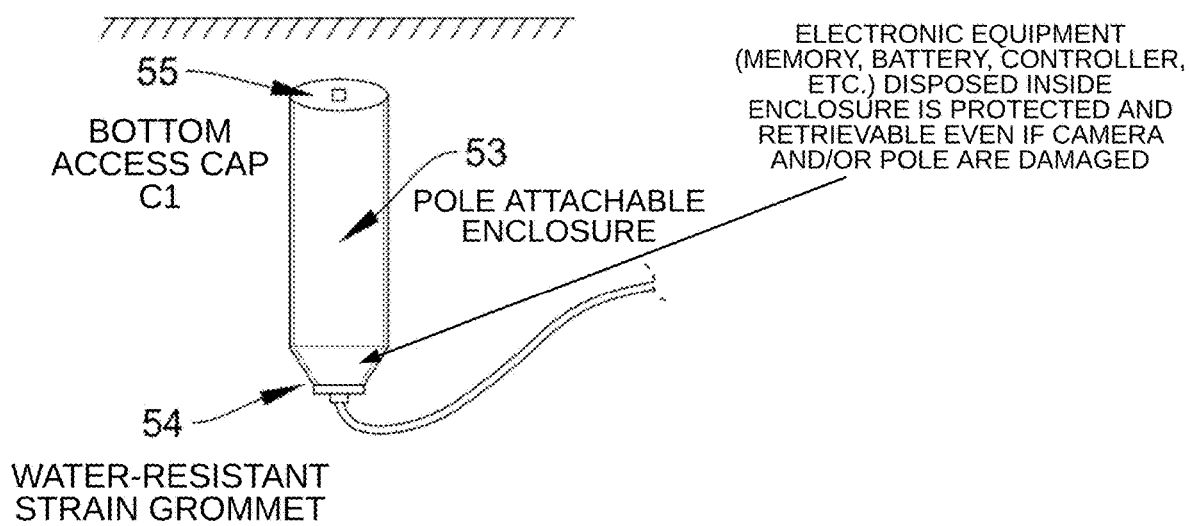
FIG. 11 shows how wiring inside the conduit continues through the ground in an embodiment of a tapered pole attachable enclosure 53.

FIG. 11 shows how wiring inside the conduit continues through the ground in an embodiment of a tapered pole attachable enclosure 53. The pole attachable enclosure 53 is used separate from the pole. The pole attachable enclosure 53 plate ring is capped with a water-resistant strain grommet 54 on one end and is buried with its bottom access cap C1 55 facing upward toward the surface of the ground. The pole attachable enclosure 53 may be buried in any fashion or even be secured to a tree or structure above the ground some distance from the pole, offering access to the camera pole support equipment within it while concealing its presence some distance from pole. The pole attachable enclosure 53 functions as an extension of the pole either attached to it or as a concealed extension of it as in FIG. 11. For example, the camera pole for cost effective operation does not have access to a network to upload its data, or only accesses it from time to time at set intervals for cost effective transfer of its data. In the meantime, an event occurs, and the pole and camera are destroyed either by a perpetrator or on accident. In the case that the memory storage, battery and other electronics are inside the pole attachable enclosure 53. The data and system can be retrieved despite the loss or damage of the camera and pole. Not only does this allow the retrieval of the data, but it cuts down on cost and replacement of the entire system.

In certain embodiments, poles are tilt type poles where it may be necessary to tilt poles in locations that would not allow a full hinge of the pole horizontally onto the ground due to surrounding obstacles or weight limitations for a single serviceman. Although the hinged base flange on the poles in the previous illustrations are optional, they would not tilt easily from the top of the pole attachable enclosure and rest on the ground without the aid of an external ground support such as a stand or sawhorse. The functionality, flexibility, and significant improvement of the novel pole attachable enclosures over conventional enclosures is clear when deployed with a pivot as illustrated in FIG. 12.

Figure 12:
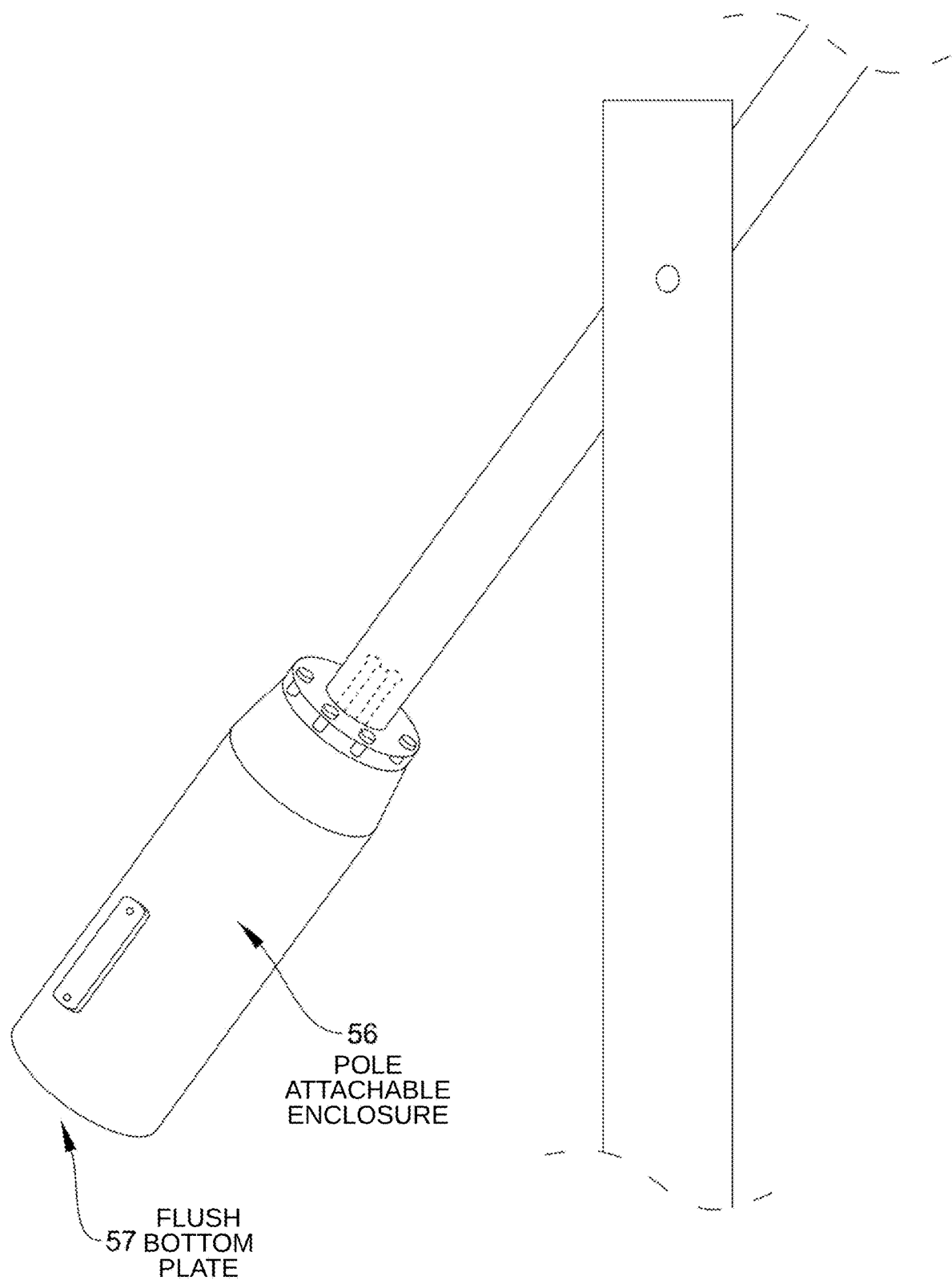
FIG. 12 shows another embodiment of a pole attachable enclosure 56 and 6-bolt flanged pole as illustrated in FIG. 5, but the pole attachable enclosure 56 has a flush bottom plate 57 with the same diameter as the pole attachable enclosure itself.
Figure 15:
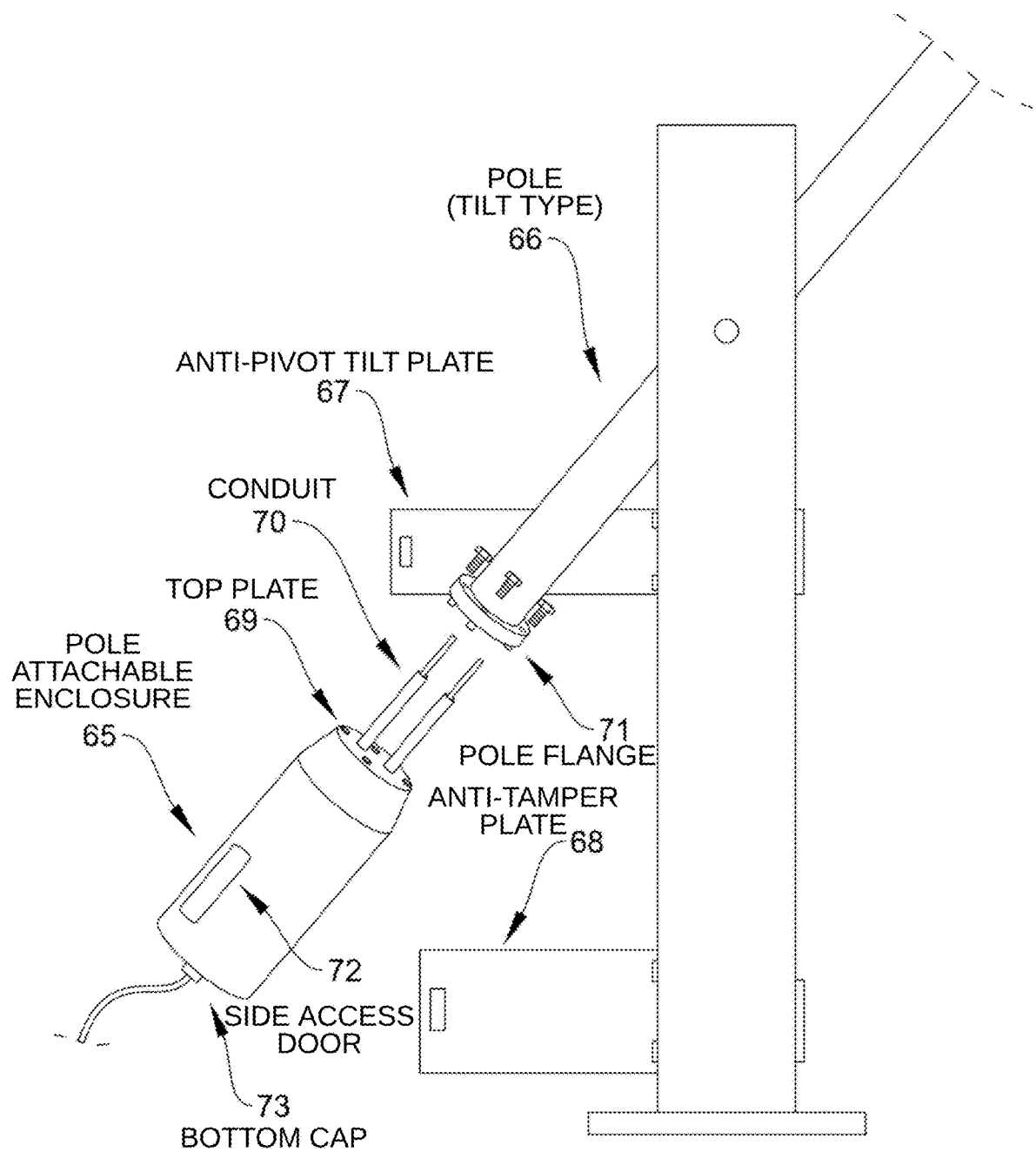
FIG. 15 is a diagram showing an embodiment of a pole attachable enclosure 65 separated from a pole 66 with a round flange on the bottom.

FIG. 12 shows another embodiment of a pole attachable enclosure 56 and 6-bolt flanged pole as illustrated in FIG. 5, but the pole attachable enclosure 56 has a flush bottom plate 57 with the same diameter as the pole attachable enclosure itself. In this deployment the pole attachable enclosure 56 fits between the base flanges and hangs off its top ring from the pole, with one or more conduits extending up inside. The electronics, batteries, and other equipment pivot and contribute as a counterweight to the pole. The pole may pivot on a bolt straight through both sides of the pivot stand for economy, or it may be secured any point along its length with a T bracket on a hinge, this making it height adjustable to accommodate different height pole attachable enclosures. The pole may rotate against the anti-pivot plate to stop rotation, or the pivot plate may be lower to brace against the pole attachable enclosure to stop rotation. In various embodiments the pole attachable enclosure can be made out of heavy enough material to assist in counterbalancing the pole. In other embodiments the pole attachable enclosure is formed from plastic or other cheaper corrosion resistant material since it is protected from vandalism and access by sides of a pivot stand. In various embodiments the pole attachable enclosure may be attached as an integral part of the pole and not require conduits extending from the top ring into the bottom opening of the pole. FIG. 15 shows in detail how the pole attachable enclosure can be bolted to the pole as in FIG. 12, with a view of how the water-resistant conduits extend from the top plate and go up inside the pole. In various embodiments there may be one or more conduits extending up into the pole. Although the pole attachable enclosure can be attached to the pole in a fashion that allows it to be sealed and an integral part of the pole itself, all poles tend to condense and leak. The ability of the pole attachable enclosure to provide a weather resistant enclosure for equipment while still allowing the pole to leak is a key feature that provides significant advantages over conventional enclosures.

Figure 13A:
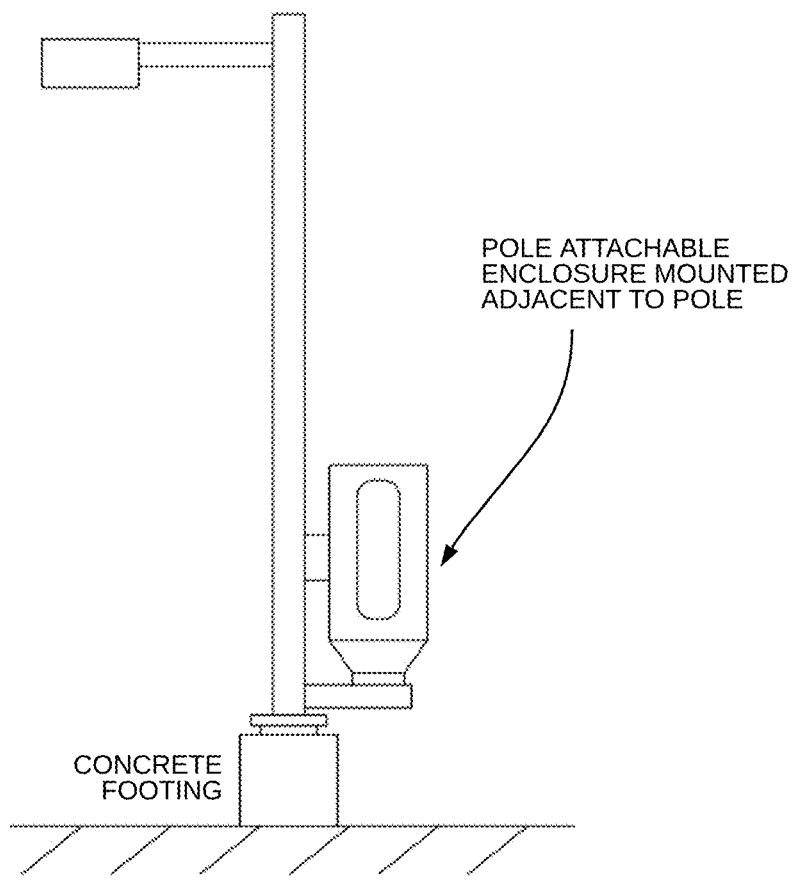
FIG. 13A is a diagram showing an embodiment in which a pole attachable enclosure is mounted adjacent to a pole.
Figure 13B:
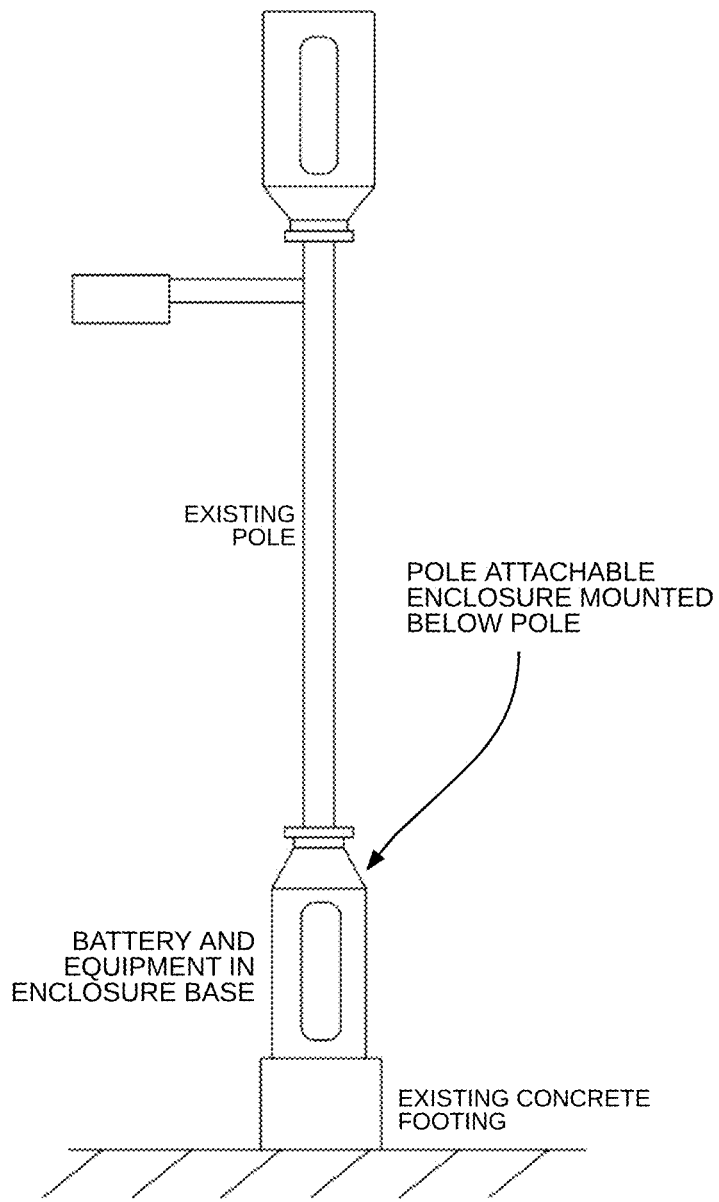
FIG. 13B is a diagram showing an embodiment in which a pole attachable enclosure is mounted below a pole.

In various embodiments the pole attachable enclosure may be mounted on top of a pole or alongside the pole of the deployment, as shown in FIGS. 13A and 13B.

FIG. 13A is a diagram showing an embodiment in which a pole attachable enclosure is mounted adjacent to a pole. The pole attachable enclosure shown in FIG. 13A may be any one of the novel pole attachable enclosures described herein.

FIG. 13B is a diagram showing an embodiment in which a pole attachable enclosure is mounted below a pole. The pole attachable enclosure shown in FIG. 13B may be any one of the novel pole attachable enclosures described herein.

Figure 14A:
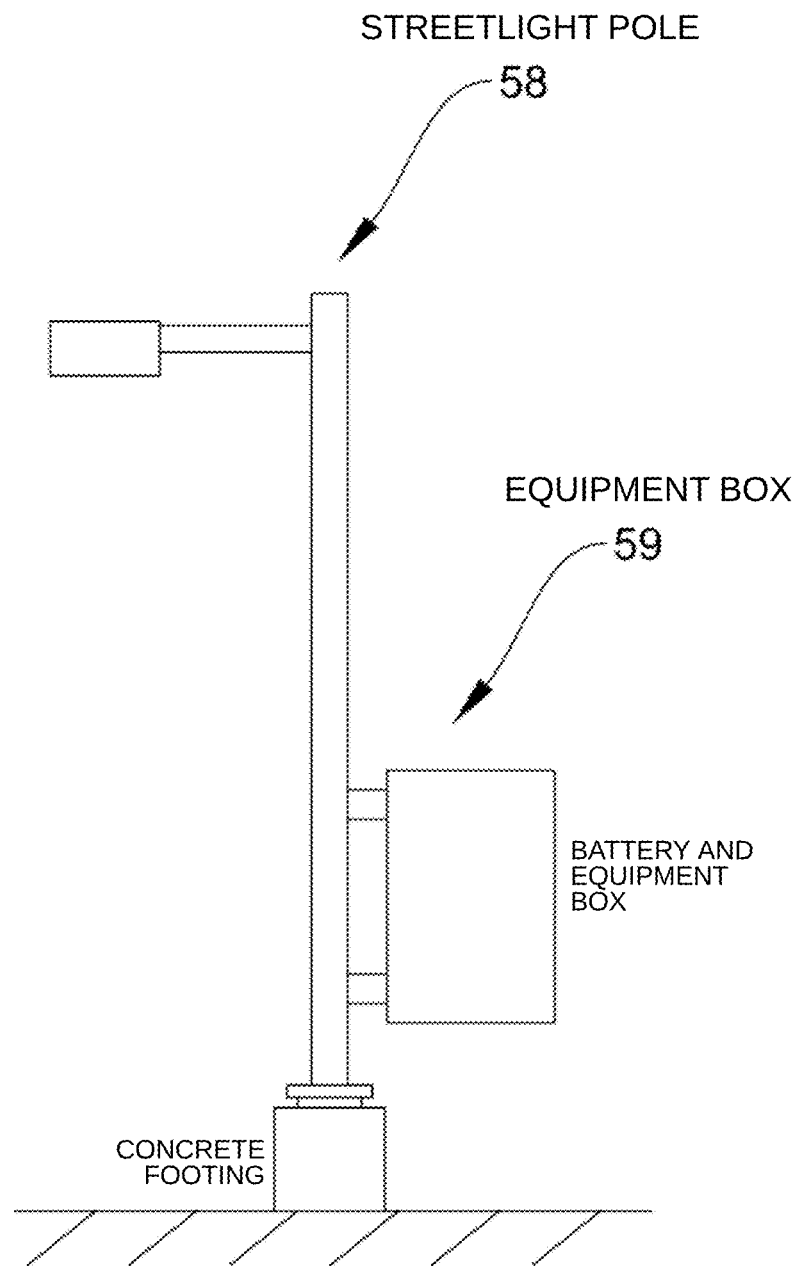
FIG. 14A shows an existing streetlight pole 58 already in place and installed in the field.

FIG. 14A shows an existing streetlight pole 58 already in place and installed in the field. The streetlight pole 58 has an adjacent electronics storage box 59. Existing streetlight poles are often bolted to a concrete base with a square flange and four bolts, and deployed for cameras, antennas, have battery and electronics storage attached in external boxes 59 bolted onto the side of them at ground level. This results in a configuration that is unsightly and subject to tampering. The novel pole attachable enclosures provide significant advantages over conventional systems because these existing poles that are bolted to concrete bases may be bolted to the top of the pole attachable enclosure. Thus, retrofitting and re-using the pole and eliminates the side box 59 of FIG. 14A.

Figure 14B:
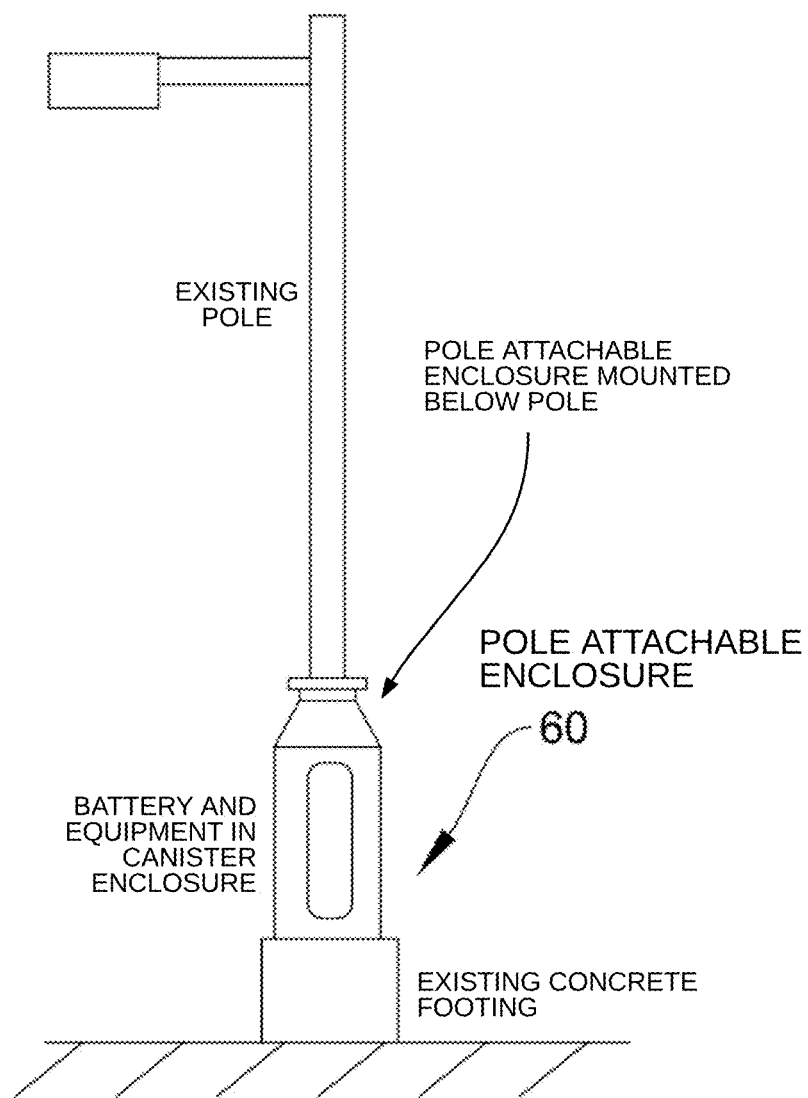
FIG. 14B is a diagram showing an embodiment where an existing streetlight pole 58 is retrofitted with a pole attachable enclosure 60.

FIG. 14B is a diagram showing an embodiment where an existing streetlight pole 58 is retrofitted with a pole attachable enclosure 60. This avoids the cumbersome and unsightly box 59 shown in FIG. 14A. In various embodiments, the pole attachable enclosure may not have a separate attachment but be welded or fused the pole or all in one piece. In various embodiments the pole attachable enclosure may be square or a shape other than round. Equipment includes batteries, electronics, wiring, solar panels, light fixture sensors, radios, network access antennas such as 5G or other radio technology on the pole, and additional electronics. The following section describes the deployment of the pole attachable enclosure in a tilt pole configuration in detail once again.

FIG. 15 is a diagram showing an embodiment of a pole attachable enclosure 65 separated from a pole 66 with a round flange on the bottom. The pole 66 is in a tilted position. The top anti pivot tilt plate 67 is swung open as well as the bottom anti tamper plate 68. The round top plate 69 of the pole attachable enclosure 65 is watertight and has bolt holes matching the round flange on the pole. The pole attachable enclosure 65 also has one or more watertight conduits 70 extending out of it at least 4 inches. In other examples, the conduits extend a distance greater than 4 inches. For the purposes of explanation, only two conduits are shown in this example. Each of the conduits 70 has a water-resistant grommet on their top for power and communication wiring. Between the bottom of the pole flange 71 and the top plate 69 of the canister there is a spacer on each bolt that is typically a half an inch or longer that allows any water in the pole 66 run out. The height of the conduit is above any snow, water or ice level runout. For purposes of explanation, the round pole flange 71 has six bolts with six spacers (three on each half circumference). In other embodiments, more or less bolts are used depending on the top plate 69 of the pole attachable enclosure 65 that is to be accommodated. This pole attachable enclosure 65 has a side access door 72 which allows access to the equipment even if the pole 66 is not tilted. In another embodiment, a more tamper resistant embodiment is provided having bolts that are accessed from inside the pole attachable enclosure, extend through the top plate and thread into the holes in the pole flange. These inside bolts are to be tightened from inside the pole attachable enclosure using this door 72, or from the bottom cap 73 access. Access to the door 73 is restricted by closing the lower anti tamper plate 68 when the pole 66 is vertical and in the vertical position. In this embodiment, the pole attachable enclosure has a pole bottom cap 73 with a water-resistant grommet instead of a solid bottom.

The diagram of FIG. 15 shows an assembled and installed version of the pole attachable enclosure of FIG. 12, except that the embodiment of FIG. 12 has a solid bottom. In FIGS. 12 and 15, in which the pole is hinged above the canister, the pole attachable enclosure may be made of cheaper, light weight corrosion resistant materials such as plastics. In FIG. 15, the pole attachable enclosure has a round flange plate attached to the bottom that is bolted to a typical concrete pole base/footing. The top plate is the same in FIGS. 12 and 15, but the pole attachable enclosure and base bear the full forced exerted by the poles, and as such, must be constructed of aluminum, steel, or other material of strength capable of withstanding the pole and load. An optional round screen is shown slipped inside the spacers between the flange and the top of the canister to keep bugs out.

Figure 16A:
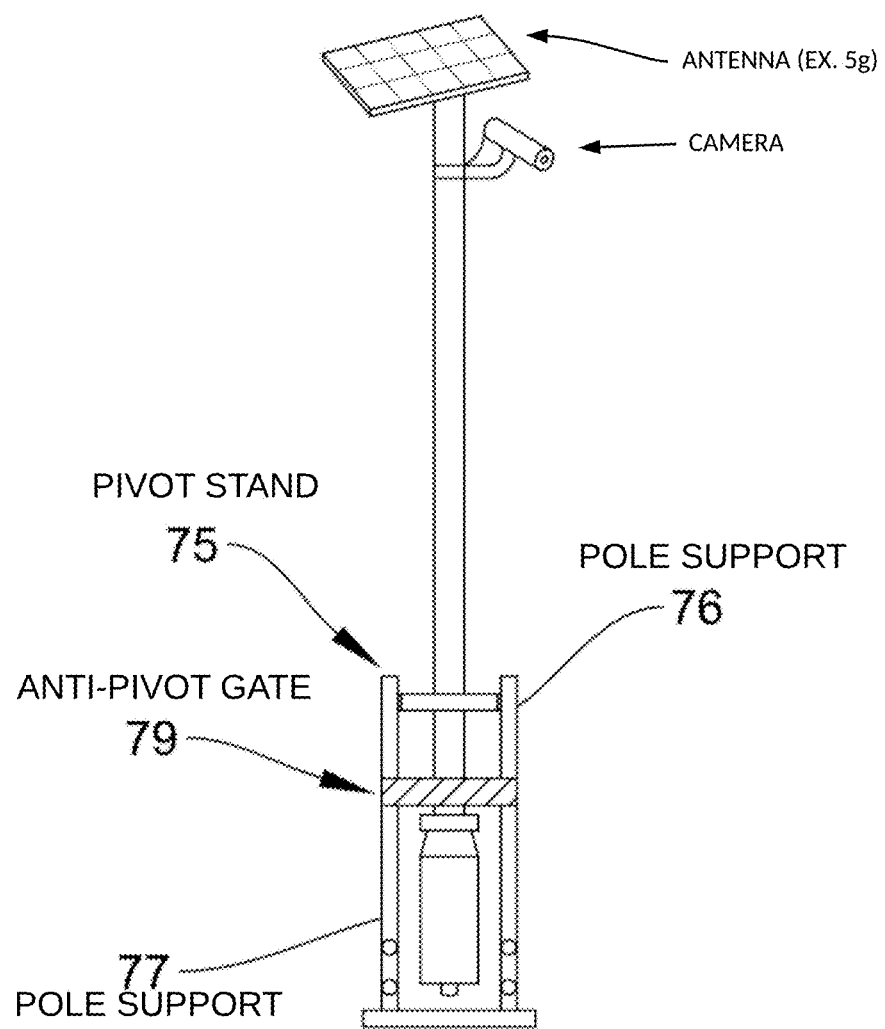
FIGS. 16A, 16B, 16C, and 16D are diagrams showing a novel pole attachable enclosure deployed in a pivot type pole.
Figure 16B:
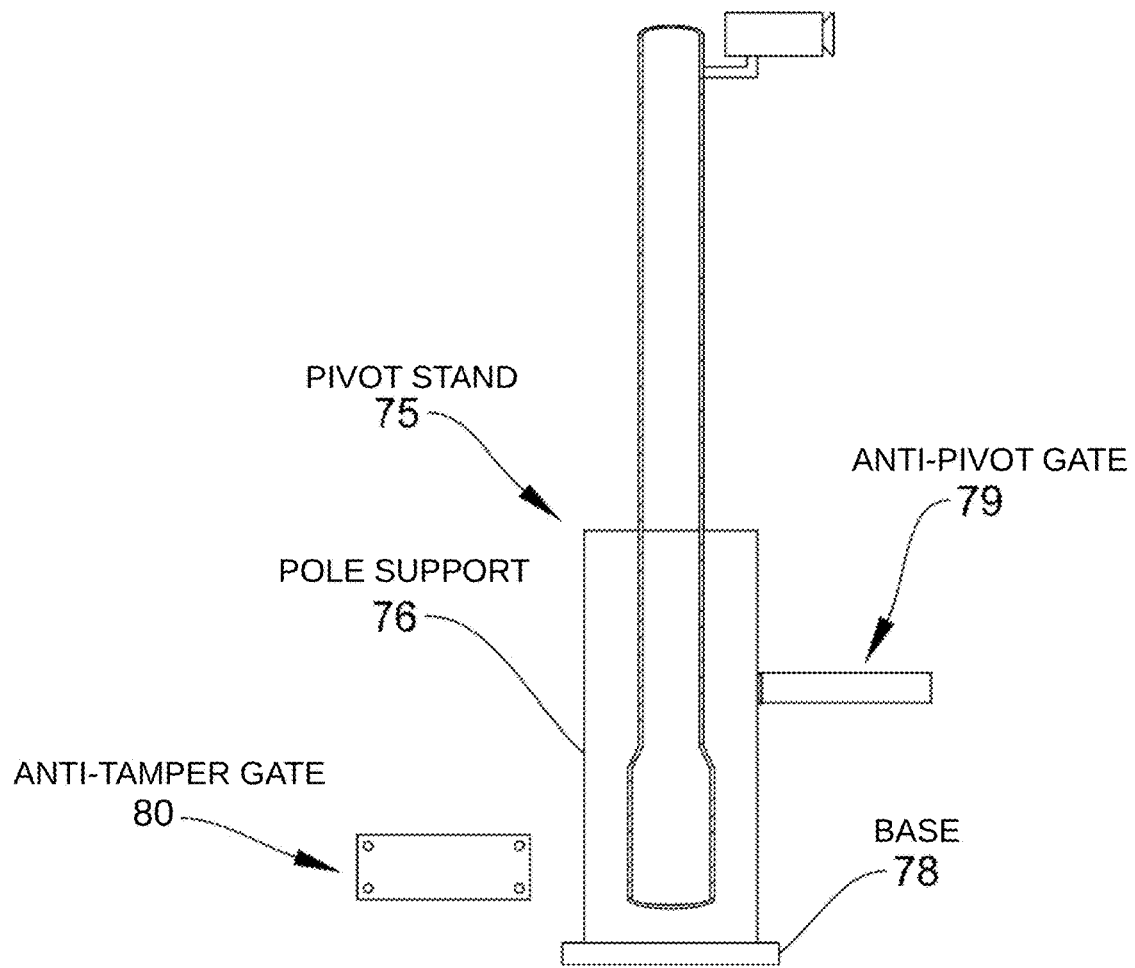
Figure 16C:
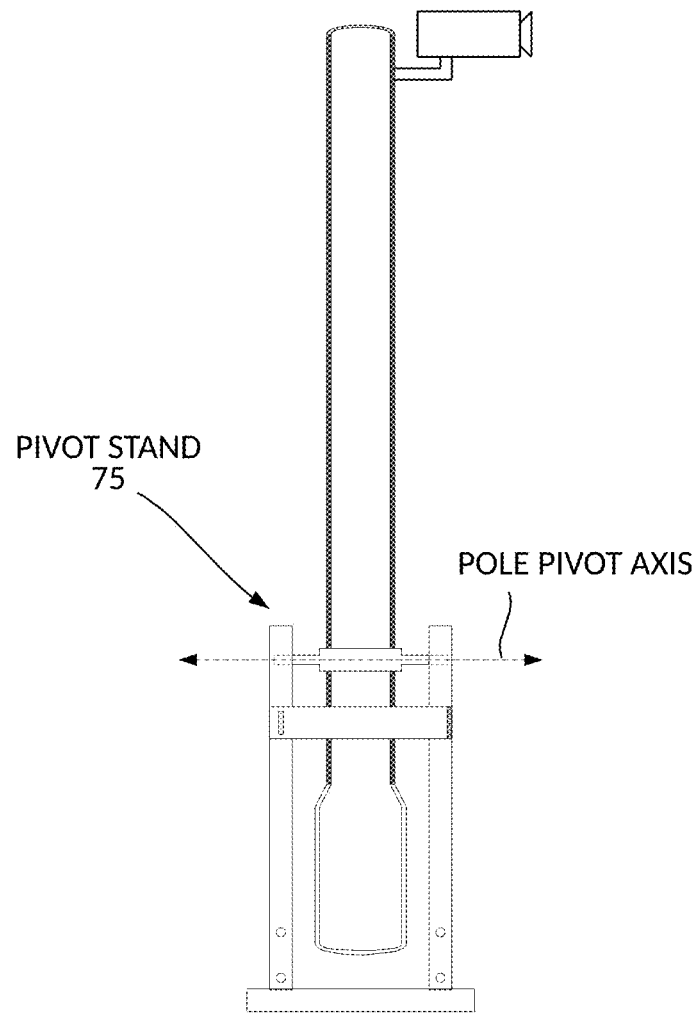
Figure 16D:
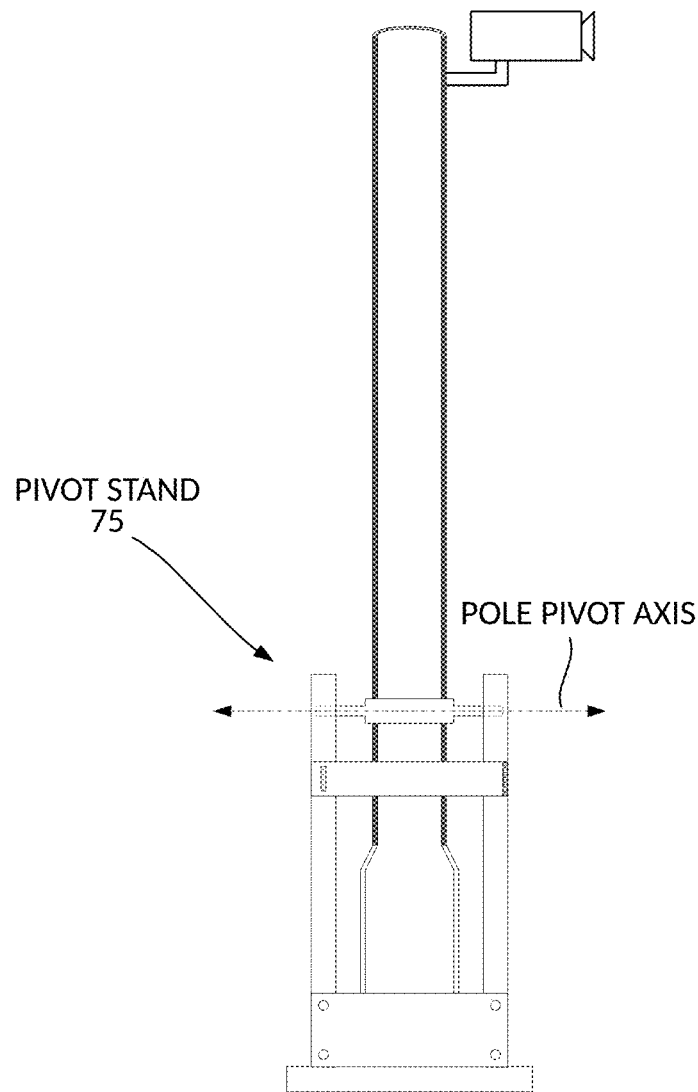

FIGS. 16A, 16B, 16C, and 16D are diagrams showing a novel pole attachable enclosure deployed in a pivot type pole. FIG. 16A is a diagram showing one example of a camera and a solar panel mounted on top of a pole with a novel pole attachable enclosure attached to the bottom of the pole and disposed within a pivot stand 75. The pivot stand 75 includes pole supports 76,77, a base 78, an anti-pivot gate 79, and an anti-tamper gate 80. The anti-pivot gate 79 and anti-tamper gate 80 are also referred to anti-pivot plate and anti-tamper plate, respectively. In this example, the anti-pivot gate 80 is on both sides of the uprights and braced against the pole moment just above the pole attachable enclosure, and the anti-tamper gate 80 is not present and removed to clearly show the pole attachable enclosure. FIGS. 16B, 16C, and 16D further illustrate the canister deployed in this fashion.

Figure 17:
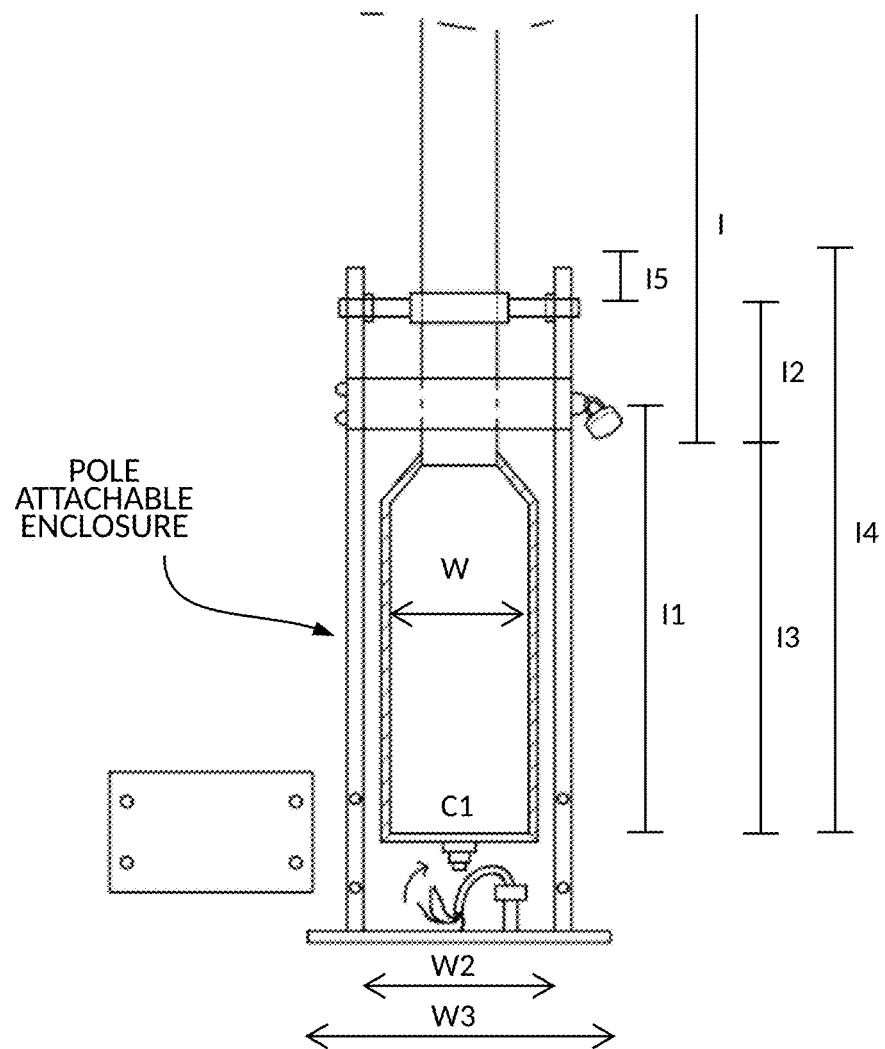
FIG. 17 is a diagram that shows an embodiment of the pivot hinge and anti-pivot gate with a hinge and padlock.

FIG. 17 is a diagram that shows an embodiment of the pivot hinge and anti-pivot gate with a hinge and padlock. Various embodiments may have the gate bolted directly to upright supports with bolts, bar, or locking slide. The access cap C1 at the bottom of the pole attachable enclosure is shown with a weather resistant grommet and a wiring conduit coming through the base plate of the pivot pole attachable enclosure. In FIG. 16A, there is a solar panel attached to the pole to run a camera and charge batteries. In some embodiments, an antenna is attached to an upper end of the pole, such as a 5G antenna. Power supply, data wiring and other connections may be connected through the wiring conduit and into the access cap grommet at the bottom of the pole attachable enclosure to support the equipment inside the pole attachable enclosure and on the pole.

Figure 18:
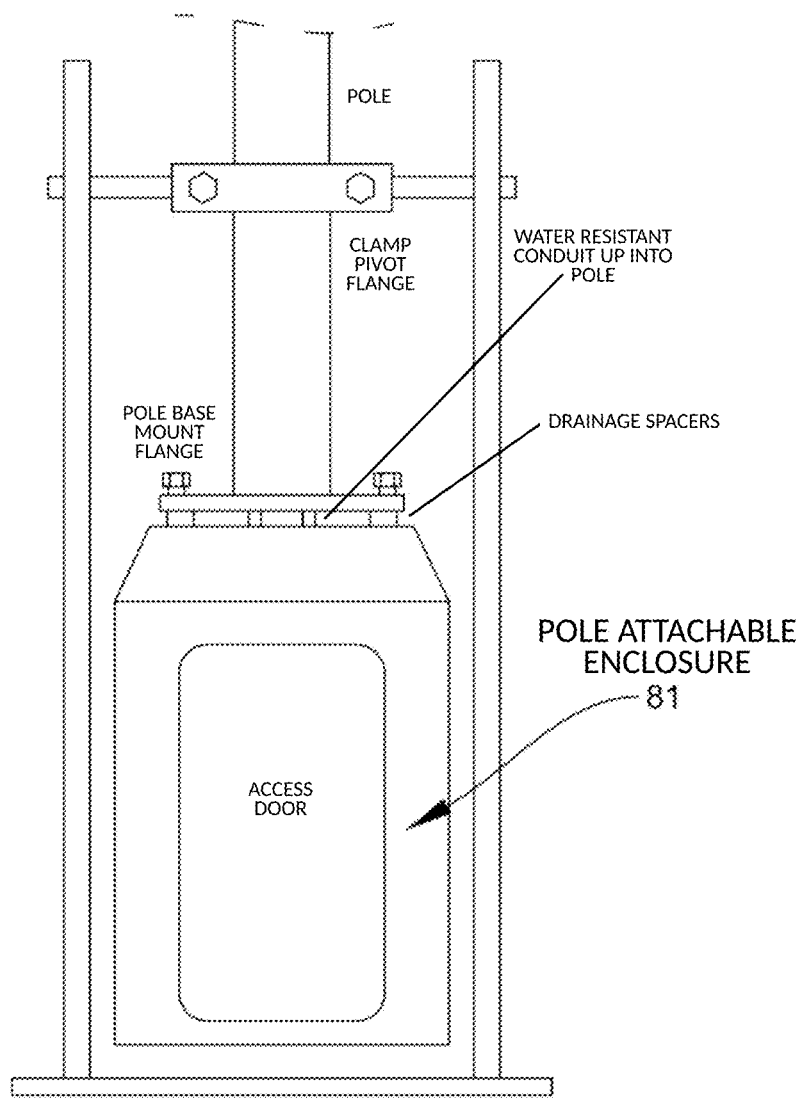
FIG. 18 is a diagram showing an embodiment of the pole attachable enclosure 81 in a drained configuration.

FIG. 18 is a diagram showing an embodiment of the pole attachable enclosure 81 in a drained configuration. The pole attachable enclosure 81 has a side door, conduits from the top of the canister, as well as an adjustable clamp. Use of the clamp allows the pole attachable enclosure 81 to have different height depending on the particular deployment.

Figure 19:
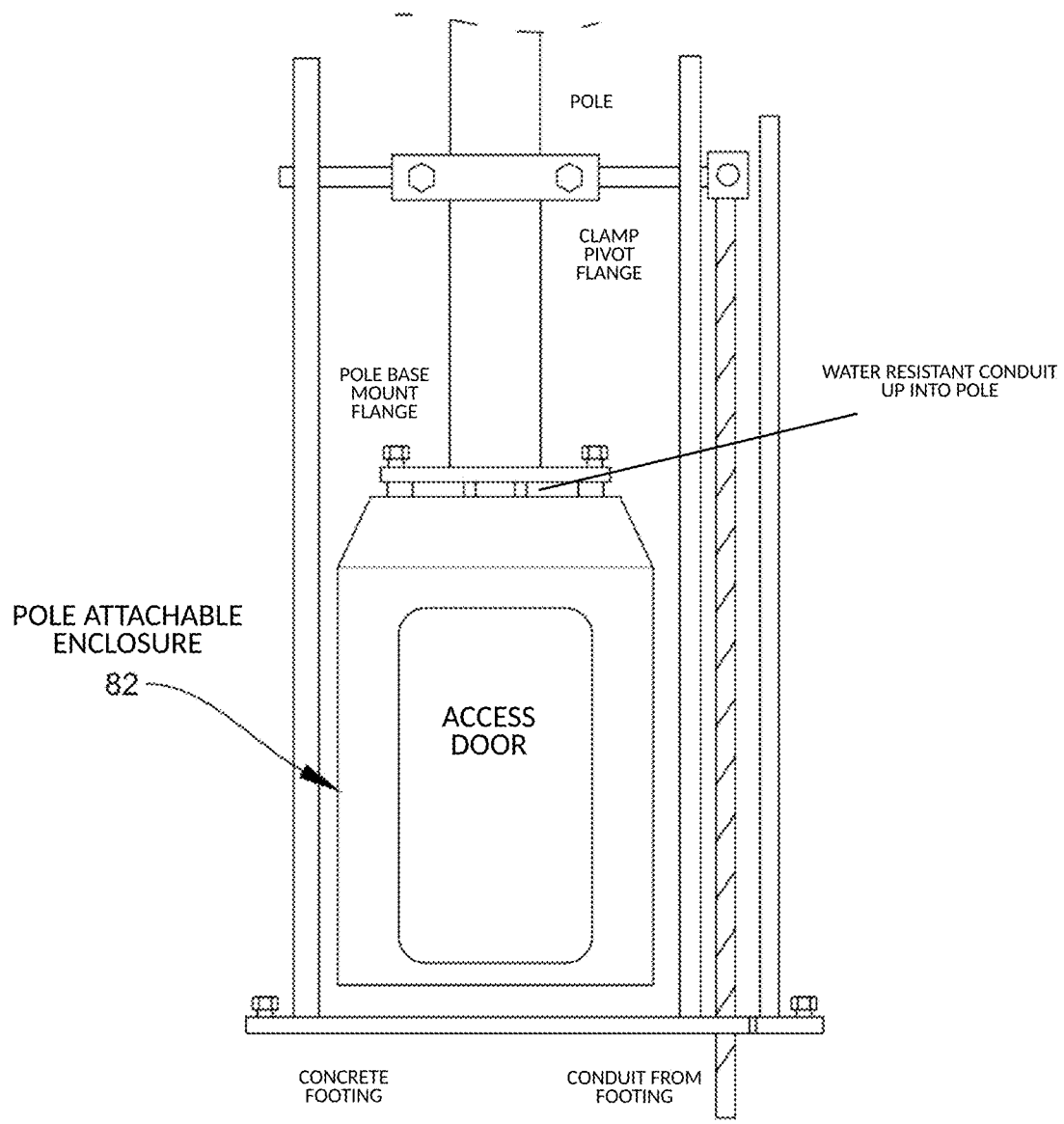
FIG. 19 is a diagram showing another embodiment of a pole attachable enclosure 82 in a drained and pivoted deployment.
Figure 20:
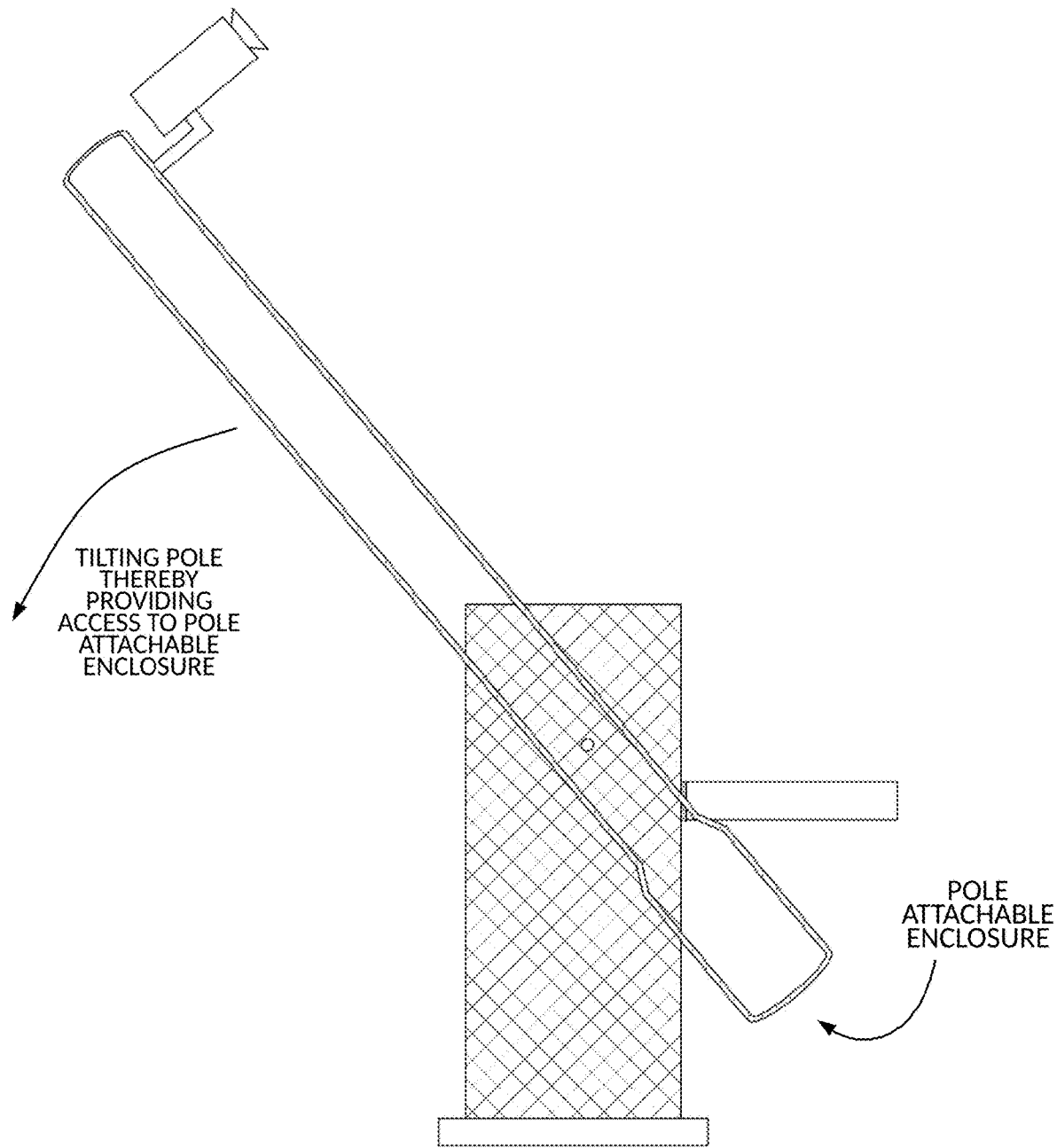
FIG. 20 is a diagram showing a pole having the novel pole attachable enclosure attached during tilting.
Figure 21:
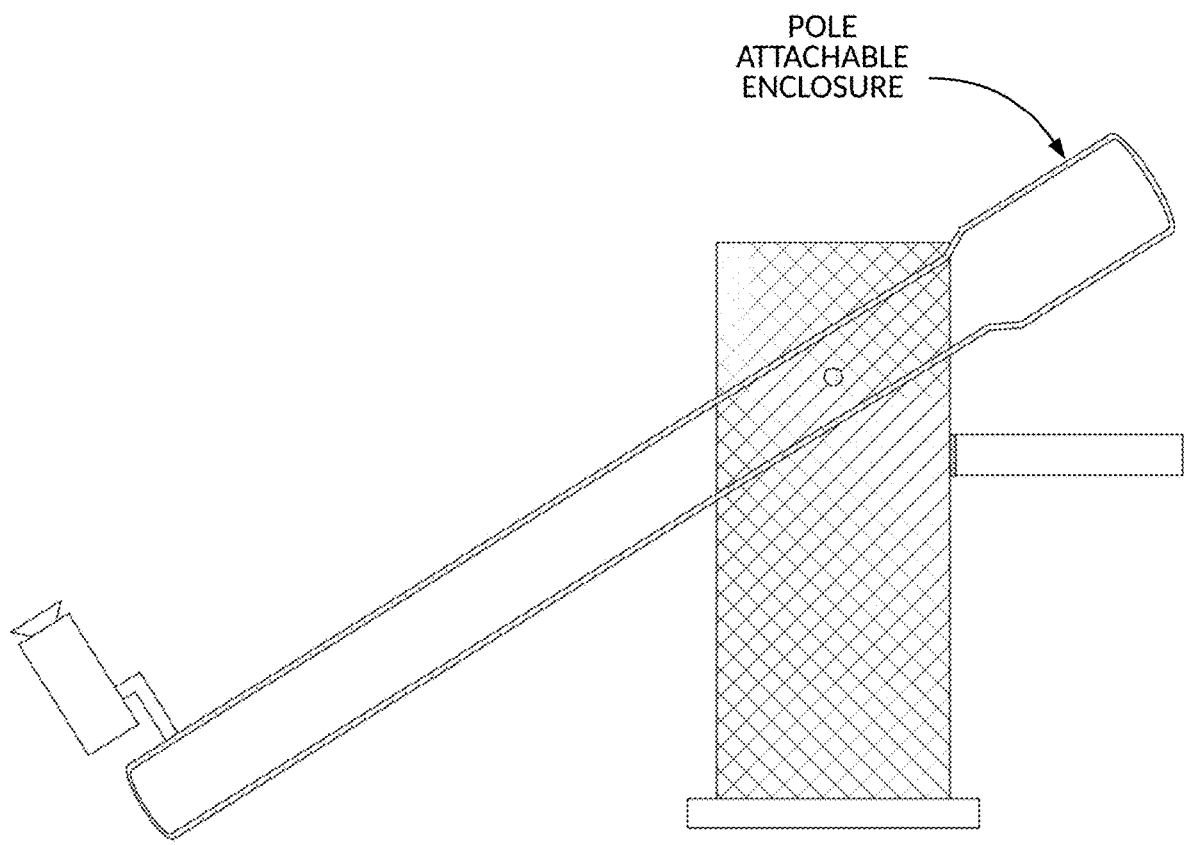
FIG. 21 is a diagram showing a pole having the novel pole attachable enclosure after tilting.

FIG. 19 is a diagram showing another embodiment of a pole attachable enclosure 82 in a drained and pivoted deployment. A hollow pin with a hole sufficiently large to receive wiring from a ground conduit is included. Provided a hole is made at the point in the pipe between the clamp contact and adequate slack is left in the wiring within the pipe, the pole attachable enclosure combination can be tipped 90 degrees or more as illustrated in FIGS. 20 and 21 without damaging the wiring. In this example, the pivot base is double walled with the conduit between running from the base to the elbow hinge to prevent tampering. The drained pole attachable enclosure deployment with hollow clamp pin thus has the advantage of the wiring being able to go through the hollow pipe pin in the clamp hinge, run up or down the pole and into the pole attachable enclosure without requiring a perfect seal at the hinge.

FIG. 20 is a diagram showing a pole having the novel pole attachable enclosure attached during tilting. The pole is tilted to provide access to the pole attachable enclosure.

FIG. 21 is a diagram showing a pole having the novel pole attachable enclosure after tilting. After tilting, the pole attachable enclosure is accessible and an operator can access components stored within the pole attachable enclosure via an access door, through a bottom cap, or via another opening.

Figure 22:
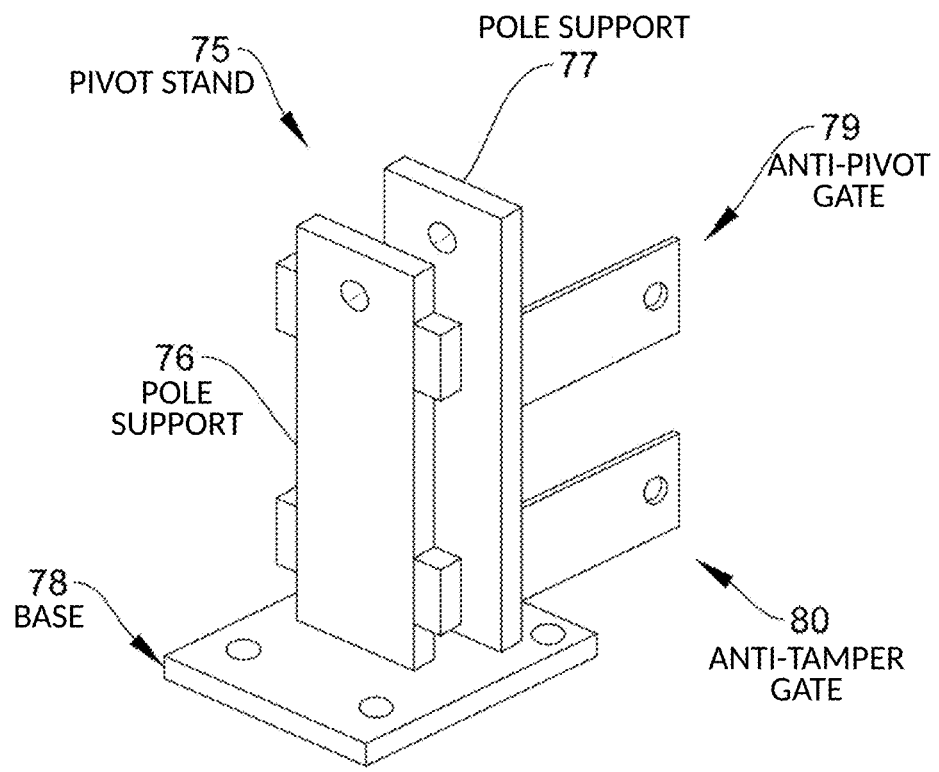
FIG. 22 is a diagram showing another example of the pivot stand 75.

FIG. 22 is a diagram showing another example of the pivot stand 75. The pivot stand 75 has both the anti-tamper gate 80 and anti-pivot plate 79 on hinges and secured with padlocks loops. For illustrative purposes, embodiments of the pole attachable enclosure deployed with a pivot base in various combinations of length L3 and diameter canisters W and pivot base widths W, W2, and W3 depending on the size of pole and application, as well as various lengths L, L1, L2, L4, L5 depending on the application and deployment scenario (dimensions labeled in FIG. 17). In various embodiments the anti-tamper plate/gate may extend any length of the entire height L4 of the pivot base on both sides, and also serve as the anti-pivot plate/gate. For cost effectiveness and flexibility of types of equipment that may be placed in the pole attachable enclosure, the pole attachable enclosure diameter W is typically larger in diameter than the pole and is just under the maximum inside diameter W2 of the pivot base (see FIG. 17 for dimension labels).

Figure 23:
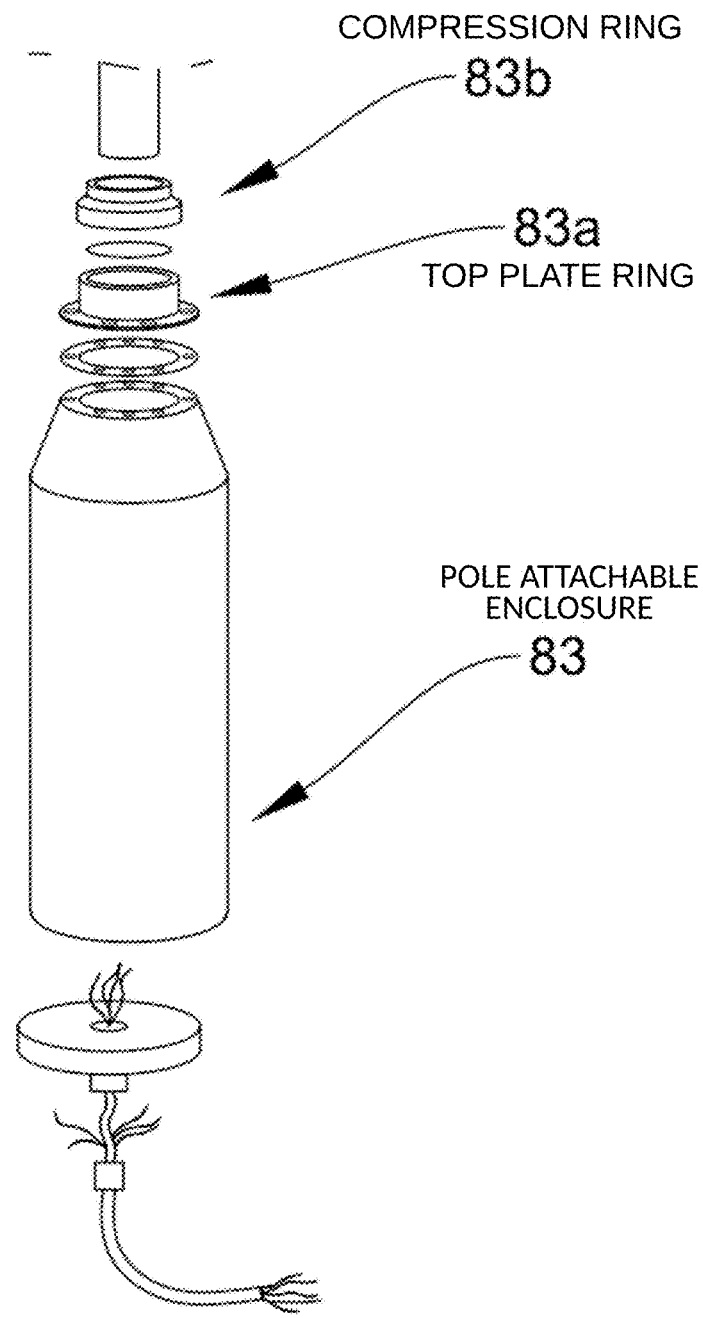
FIG. 23 is a diagram of another embodiment of a pole attachable enclosure 83 having a tapered body canister with a top plate as a ring.

FIG. 23 is a diagram of another embodiment of a pole attachable enclosure 83 having a tapered body canister with a top plate as a top plate ring 83a. This embodiment accommodates a wide range of attachment devices to various diameter poles. In this example a large compression ring 83b and fitting is attached to the top plate ring that is affixed at the tapered end of the pole attachable enclosure. In this example the top plate ring 83a is designed as a part of, as a single unitary structure, the pole attachable enclosure 83 for cost effectiveness. In other embodiments, it may be a separate component that attaches to the pole attachable enclosure.

Figure 24:
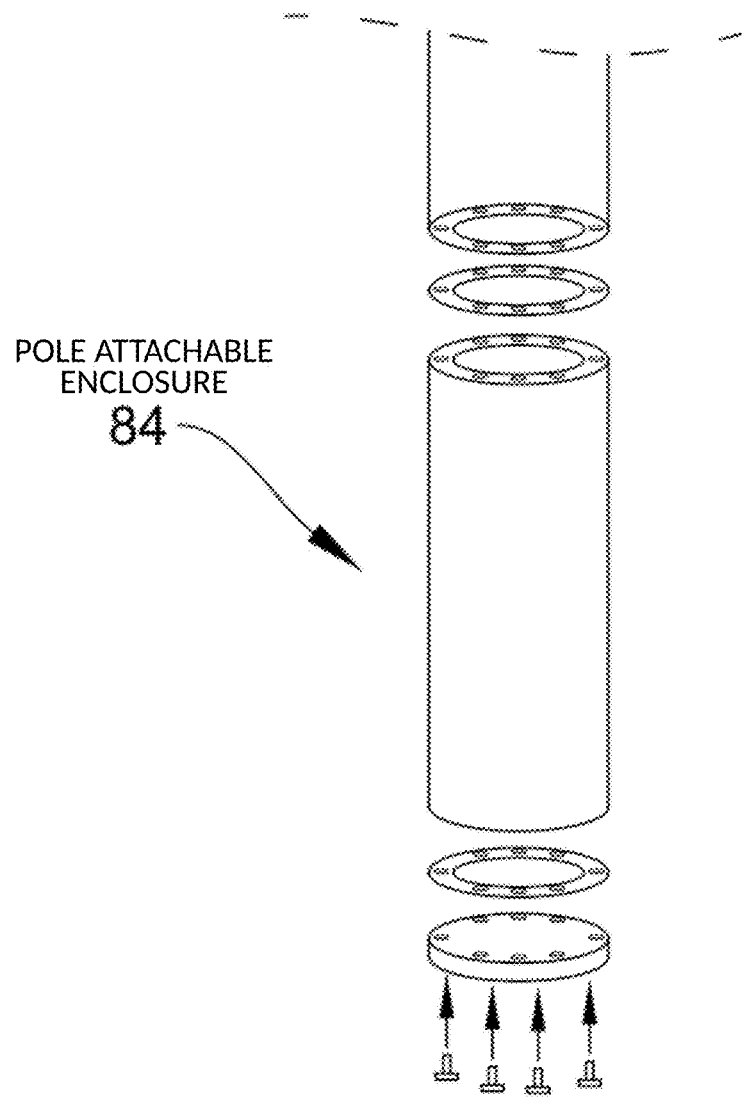
FIG. 24 is a diagram of another embodiment of a pole attachable enclosure 84.

FIG. 24 is a diagram of another embodiment of a pole attachable enclosure 84. The pole attachable enclosure 84 has three plate rings that are separate components placed inside the pole. Both inside ends of the pole attachable enclosure 84 are used to facilitate joining the pole to the attachable enclosure. In this example, the pole attachable enclosure 84 has the same diameter as the pole. The bottom plate of the pole attachable enclosure 84 also has the same diameter as the pole.

Both FIGS. 23 and 24 allow the pole attachable enclosure 84 to be of a different diameter and material than the pole. Although poles are typically formed from steel, aluminum or other material required for strength and support of camera and other equipment in the outdoor environment, the pole attachable enclosure may be of lighter, corrosion resistant material. Because the pole attachable enclosure need not be a load bearing portion of the pole and is protected by the sides of the pivot base, it can be of cheaper, lighter material with other properties that facilitate the containment of various custom equipment in a cost effective and accessible fashion.

In the example of FIG. 23, a single ring is an integral part of the pole attachable enclosure 83 and functioning as a template to which a compression flange or other attachment may be secured with a gasket in between. In the example of FIG. 24, the ring is an integral part of the pole attachable enclosure 84 attaching to an actual ring component that has been secured to the inside of a pole, with a gasket disposed in between.

Figure 25:
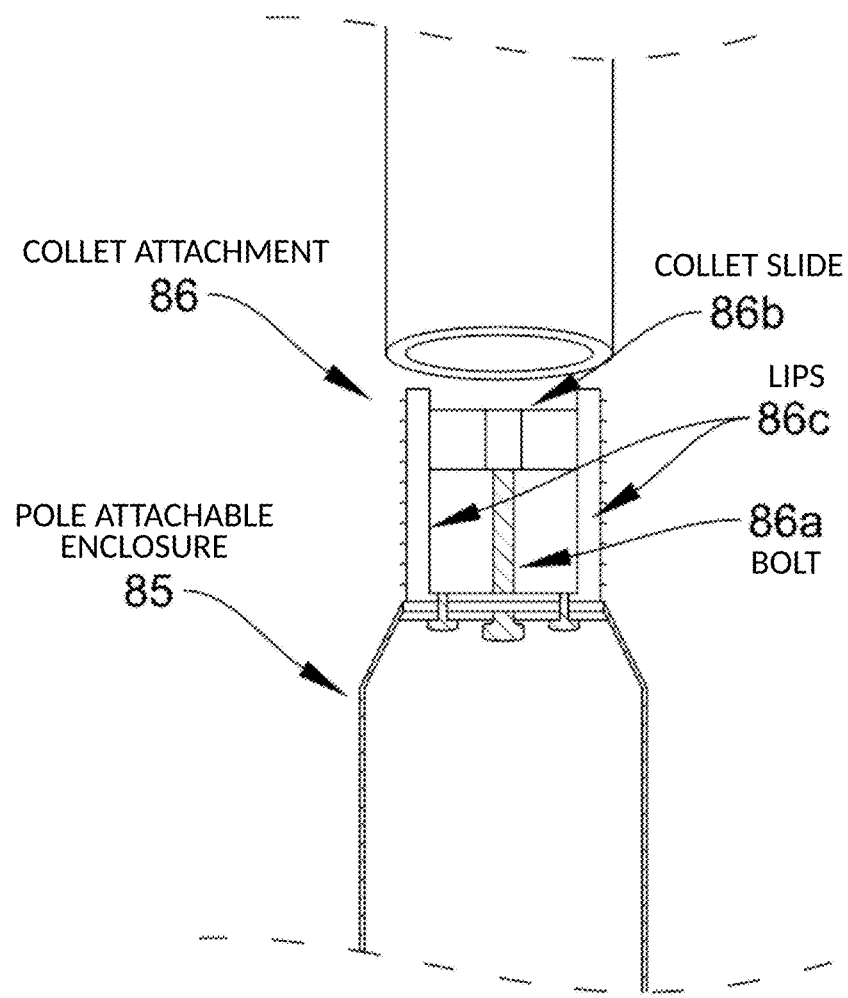
FIG. 25 is a diagram showing a side view of a pole attachable enclosure 85 with the inside collet attachment 86 that facilitates fast, weather sealed, cost effective attachment to a wide range of pole types and diameters.

FIG. 25 is a diagram showing a side view of a pole attachable enclosure 85 with the inside collet attachment 86 that facilitates fast, weather sealed, cost effective attachment to a wide range of pole types and diameters. The collet attachment 86 secures to the top plate of the canister. The collet attachment 86 comprises a tapered collet slide 86b that slides up and down inside two edge lips which are tapered to match the slide. When the bolt 86a threaded on the middle of the collet slide is tightened, the collet slide 86b slides down the lips 86c and expands the diameter between them inside the pole. The grip surface on the outside of the lip walls 86c are rubberized grip to form a tight seal with the inside of the pole. The collet attachment 86 secures to the pole attachable enclosure 85 by means of a collet top ring.

Figure 26:
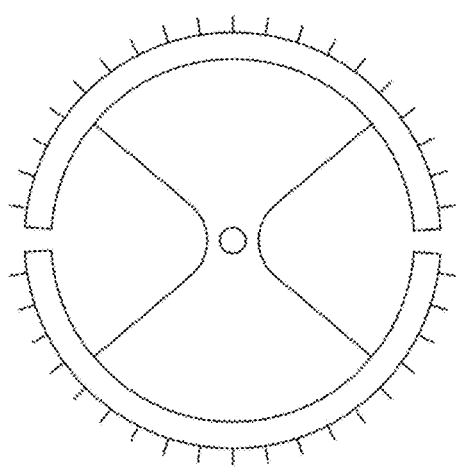
FIG. 26 is a diagram showing a view of the two split sides of the collet slide attachment looking down onto the top of the pole attachable enclosure plate.

FIG. 26 is a diagram showing a view of the two split sides of the collet slide attachment looking down onto the top of the pole attachable enclosure plate. This embodiment has symmetric design with space on each side to allow wires and other connections for power, data and other attachments to run between the equipment in the pole attachable enclosure into the pole.

Figure 27:
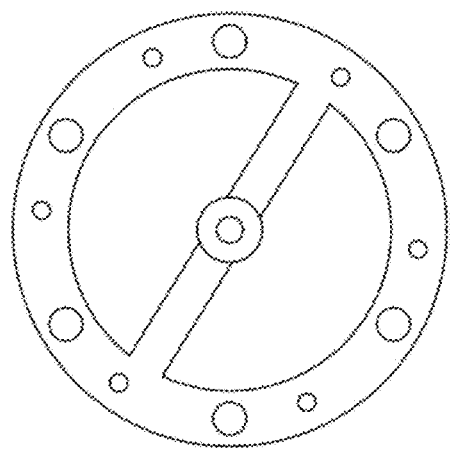
FIG. 27 is a diagram showing the collet ring plate functioning as the top plate of the pole attachable enclosure which allows the collet attachment to be connected.

FIG. 27 is a diagram showing the collet ring plate functioning as the top plate of the pole attachable enclosure which allows the collet attachment to be connected. In this example it has two spokes with a hole for the collet slide tighten bolt in the middle. The bolt head is accessible to tighten and untighten in the collet slide as illustrated in FIG. 26. This embodiment also has space on each side to allow connections to pass between the pole attachable enclosure, through the collet slide located above it in FIG. 25, and into the pole. In various embodiments it may have one spoke or more than two spokes.

Figure 28:
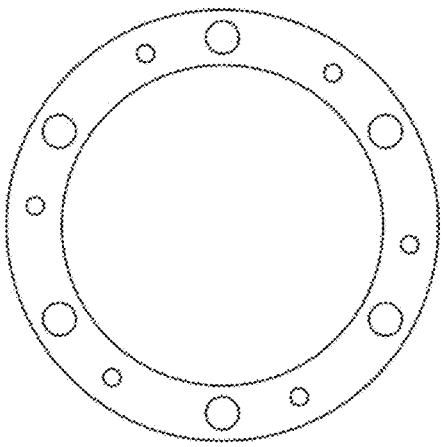
FIG. 28 is a diagram showing the collet ring plate without the center spokes.

FIG. 28 is a diagram showing the collet ring plate without the center spokes. Both embodiments of FIGS. 27 and 28 show the plate with the plates with two alignment pins 180 degrees apart, and two additional sets of matching alignment holes that like the attachment holes go through both sides of the plate. The pins fit into these holes when in contact with another matching ring, and the orientation between rings may be rotated to select which sets of attachment holes line up between the rings. In the illustrative example of FIG. 28, the pins an alignment holes may be rotated to allow two smooth attachment holes on top of each other, two threaded on top of each other, threaded on first ring smooth on second ring, or smooth on first ring and threaded on second ring. In various embodiments slots or other connectors besides holes and threads may be around the outside of the plate and used for various attachments.

In other embodiments, the plate in FIG. 27 may have more than a single cross member with hole as in FIG. 27, but may have two, three, or more spokes for strength. FIGS. 27 and 28 show a ring plate with 6 equal sized holes which alternate threaded and non-threaded. In other embodiments the plate in FIGS. 27 and 28 may have other combinations of threaded and non-threaded smooth holes of various diameter as well as slots and other mounting points, as well as any number of holes. Different sized collet attachments may be secured to the end of different canisters by means of the plate ring to accommodate different diameter poles. In various embodiments the collect attachment may be built as part of the pole attachable enclosure and not as separate component. In other embodiments the collet slide may be absent and the bolt may be replaced by a longer threaded rod running through the ring spoke hole, into the pole and attached to the other end (top) of the pole/pipe, thus securing the pole attachable enclosure to the end of the pole with a rod running from one of the pole to the other or from a rod attached at some point inside its internal length. This embodiment does not require a collet module with the slide but only the collet top ring functioning as the top plate of the pole attachable enclosure.

FIGS. 26, 27, and 28 show different adapter plate rings that may be used on the pole to attach to the top of the pole attachable enclosure. In various embodiments, the pole attachable enclosure plate "ring" and or the pole it attaches to may be shapes other than round. In other embodiments different adapter plates or no adapter plates might be used.

FIGS. 26, 27, and 28 also show embodiments of attaching poles to the canister using the pole attachable enclosure adapter rings, in a non-draining deployment in which the pole and the pole attachable enclosure must be sealed together. A pole attachable enclosure that attaches to the end of a for a tilting pole mounted on a pivot stand, which is designed to contain weights, batteries, electronics, or other equipment. A pivot stand that allows mounting of a pole attachable enclosure to a pole between two or more upright supports, that has removable and lockable anti-pivot and anti-tamper plates/gates, that that allows different pole attachable enclosures to be accessible at ground level while being protected from the elements, vandalism, and tampering. A pivot stand with swinging T arm bracket that can secure any size diameter pole size, that can quickly slide over a pole and be secured and tightened at a desired position along the pole, that is hinged between two parallel support columns with a distance between them greater than or equal to the width of a pole attachable enclosure attached to the end of the pole. The pole attachable enclosure plate ring allows attaching different types of pole attachable enclosures to the end of a pole with a weather and water resistance seal, that allows wiring and other equipment to pass through it and be connected from the end of pole to equipment within the pole attachable enclosure. The preferred embodiment of the canister top and bottom plates is that they be solid, and an integral part of the pole attachable enclosure and the appropriate holes made for the bolts and conduits as needed. In various embodiments the pole attachable enclosure top and bottom plates may be separate components which are bolted or welded to the pole attachable enclosure in some fashion to be sealed and strengthened. In various embodiments the top or bottom may be a pole attachable enclosure plate ring.

Figure 29:
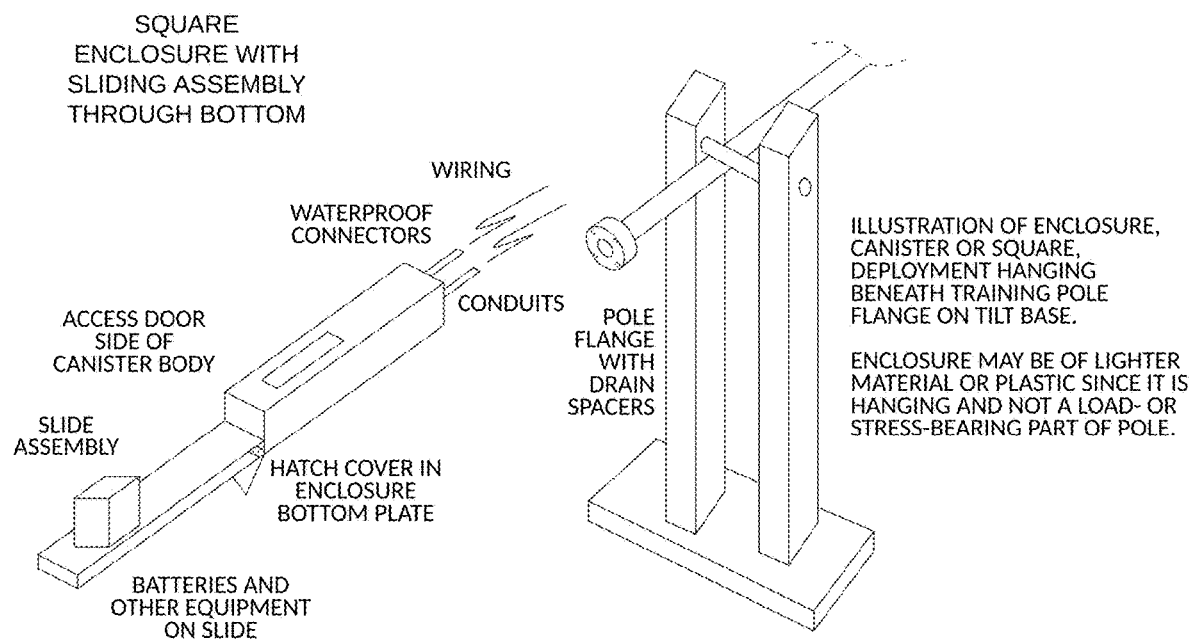
FIG. 29 is a diagram of a pole attachable enclosure that includes a sliding assembly.

FIG. 29 is a diagram of a pole attachable enclosure that includes a sliding assembly. The sliding assembly slides along a conduit track disposed within the pole attachable enclosure. The sliding assembly is accessible from an end of the pole attachable enclosure. For additional information on the structure and operation of the sliding assembly, and how the sliding assembly is integrated into the pole attachable enclosure and pole, see: U.S. patent application Ser. No. 16/414,755, entitled "Camera Mount Plate And Module Access Slide For Poles Used For Roadside Electronic Systems," filed on May 16, 2019, by Glenn Joseph Bronson (the entire subject matter of this patent document is hereby incorporated by reference).

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A pole attachable enclosure comprising:
   a body, wherein the body has an exterior and an interior, and wherein the body is a single unitary structure that is isolable from outside elements; and
   a plate, wherein the plate has an opening, a first side, and a second side, wherein the first side of the plate is attached to an end of the body, wherein the second side of the plate is attachable to an end of a pole, wherein when equipment is disposed within the body, equipment within the body is connectable to equipment within the pole via the opening, and wherein equipment disposed within the interior of the body is environmentally isolable from the exterior of the body.

2. The pole attachable enclosure of claim 1, wherein the body is sealed and waterproof.

3. The pole attachable enclosure of claim 1, further comprising:
   a bottom plate that is a sealed cap or a bottom plate that accepts conduits and footing mount bolts.

4. The pole attachable enclosure of claim 1, wherein the plate has a sealed conduit that extends into the pole via the opening when the pole attachable enclosure is mounted onto.

5. The pole attachable enclosure of claim 1, wherein the plate is a plate ring that attaches to the pole using a weather resistant seal, wherein the plate ring provides direct access from the pole attachable enclosure to the inside of the pole, and wherein the body has a weather resistant access cover or hatch that allows equipment to be inserted inside the pole attachable enclosure.

6. The pole attachable enclosure of claim 1, wherein the plate attaches to poles with flanges with drain spacers or without drain spacers and has a weatherproof or sealed conduit that extends through the plate via the opening and into the pole that the pole attachable enclosure is mounted to, wherein the body has a weather resistant access cover or hatch that allows equipment to be inserted inside the body, and wherein a bottom plate is securable to a footing.

7. The pole attachable enclosure of claim 1, wherein the pole attachable enclosure is formed from heat conductive material that has heat sinks inside the body and has cooling fins on the outside of the body.

8. The pole attachable enclosure of claim 1, further comprising:
   a collet attachment that consists of a collet plate, sidewalls that slide inside a pole, and a collet slide that is tightened by a bolt, wherein the collet attachment attaches to one end of the pole attachable enclosure forming a weather and water tight seal with the pole.

9. The pole attachable enclosure of claim 1, wherein weather resistant access is disposed along a side or bottom of the body, and wherein the weather resistant access is a cover or hatch that selectively opens to provide access to the interior of the body.

10. The pole attachable enclosure of claim 1, further comprising:
    a weather resistant access that is selectively opened or closed, wherein when the weather resistant access is opened, equipment is insertable into the body, and when the weather resistant access is closed.

11. The pole attachable enclosure of claim 1, wherein the plate accepts at least one attachment selected from the group consisting of: flanges, a plurality of various sized threaded fittings, compression fittings, water resistant wire grommets, and solid caps.

12. The pole attachable enclosure of claim 1, wherein the plate accepts an attachment that allows the plate to be attached to various diameter poles.

13. The pole attachable enclosure of claim 8, wherein a tightening bolt is tightened and secured from inside the body with a bolt head or stud with a nut, and wherein the opening allows wiring equipment within the body to have access to the inside of the pole.

14. The pole attachable enclosure of claim 1, wherein the plate is integrally formed from the single unitary structure.

15. The pole attachable enclosure of claim 1, wherein the second side of the plate directly attaches to the end of the pole.

16. The pole attachable enclosure of claim 1, wherein the second side of the plate attaches to the end of the pole via another intermediate structure.

17. An apparatus comprising:
    a plate, wherein the plate has an opening; and
    means for enclosing and environmentally sealing equipment from an outer environment, wherein the means is attachable to the plate such that equipment within the means is coupleable to equipment within a pole via the opening of the plate, and wherein the means is integrally formed from a unitary structure.

18. The pole attachable enclosure of claim 17, wherein the means for is selected from the group consisting of: a body of a pole attachable enclosure that is contacting the pole, a body of a pole attachable enclosure that is not contacting the pole, a body of a pole attachable enclosure that is disposed at a base of a pole and contacting the pole, a body of a pole attachable enclosure that is disposed at a base of a pole and not contacting the pole, a body of a pole attachable enclosure that is disposed adjacent to a pole and contacting the pole, a body of a pole attachable enclosure that is disposed adjacent to a pole and not contacting the pole, a body of a pole attachable enclosure that is partially buried below ground and contacting the pole, a body of a pole attachable enclosure that is partially buried below ground and not contacting the pole, a body of a pole attachable enclosure that is entirely buried below ground and contacting the pole, and a body of a pole attachable enclosure that is entirely buried below ground and not contacting the pole.

19. A method comprising:
    attaching a pole attachable enclosure to an end of a pole, wherein the pole is part of a new pole installation or existing installed pole, wherein the pole attachable enclosure has a body with an interior that is environmentally sealable, wherein the body is a single unitary structure, and wherein the pole attachable enclosure is attached to the pole such that the pole attachable enclosure is attached to an end of the pole, attached adjacent to the pole, or attached such that the pole attachable enclosure is partially or fully buried below ground underneath the pole.

20. The method of claim 19, further comprising:
    inserting a device within the body, wherein the body has an opening; and
    connecting the device to equipment within the pole via the opening.

* * * * *